US 12,494,025 B1

(12) United States Patent
Zollmann et al.

(10) Patent No.: US 12,494,025 B1
(45) Date of Patent: Dec. 9, 2025

(54) SMART PLACEMENT OF EXTENDED REALITY WIDGETS

(71) Applicant: Snap Inc., Santa Monica, CA (US)

(72) Inventors: Stefanie Zollmann, Otago (NZ); Daniel Wagner, Vienna (AT)

(73) Assignee: Snap Inc., Santa Monica, CA (US)

( * ) Notice: Subject to any disclaimer, the term of this patent is extended or adjusted under 35 U.S.C. 154(b) by 212 days.

(21) Appl. No.: 18/208,545

(22) Filed: Jun. 12, 2023

(51) Int. Cl.
*G06T 19/00* (2011.01)
*G06T 15/06* (2011.01)

(52) U.S. Cl.
CPC ............ *G06T 19/006* (2013.01); *G06T 15/06* (2013.01)

(58) Field of Classification Search
None
See application file for complete search history.

(56) References Cited

U.S. PATENT DOCUMENTS

| 11,402,871 | B1* | 8/2022 | Berliner | G06T 7/70 |
| 12,141,907 | B2* | 11/2024 | Cross | G06T 15/00 |
| 12,198,427 | B2* | 1/2025 | Zhang | G06T 19/006 |
| 2023/0046155 | A1* | 2/2023 | Lu | G06F 3/04842 |
| 2023/0139337 | A1* | 5/2023 | Noam | G06F 3/165 |
| | | | | 345/156 |
| 2023/0146384 | A1* | 5/2023 | Terre | G06V 20/20 |
| | | | | 345/156 |

* cited by examiner

*Primary Examiner* — Robert J Craddock
(74) *Attorney, Agent, or Firm* — Schwegman Lundberg & Woessner, P.A.

(57) ABSTRACT

Examples described herein relate to the dynamic placement of virtual content, such as virtual content widgets, to provide an extended reality (XR) experience. An XR device accesses sensor data from one or more sensors. User context associated with a user of the XR device is determined based on the sensor data. A virtual content widget is identified for presentation to the user. A widget location is selected based on the user context. The XR device causes presentation, via a display component, of the virtual content widget at the widget location.

20 Claims, 12 Drawing Sheets

SMART PLACEMENT OF EXTENDED REALITY WIDGETS

TECHNICAL FIELD

Subject matter disclosed herein relates generally to extended reality (XR). More specifically, but not exclusively, the subject matter relates to the dynamic placement of virtual content, such as virtual content widgets, to provide an XR experience to a user.

BACKGROUND

An augmented reality (AR) device enables a user to observe a real-world scene while simultaneously seeing virtual content that may be aligned to objects, images, or environments in the field of view of the AR device. A virtual reality (VR) device provides a more immersive experience than an AR device. The VR device blocks out the field of view of the user with virtual content that is displayed based on a position and orientation of the VR device. In general, AR and VR devices are referred to as XR devices, and related systems are referred to as XR systems.

To provide a user with an enjoyable, useful, or immersive XR experience, it is important to place virtual content in suitable positions from the perspective of the user. Incorrect or inappropriate positioning of virtual content can lead to technical and practical issues, such as information overload, user discomfort, attention tunneling, or occlusion of real-world features (which may, for example, have negative safety implications). These issues may be particularly problematic in cases where XR devices are used for continuous or extended periods of time.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
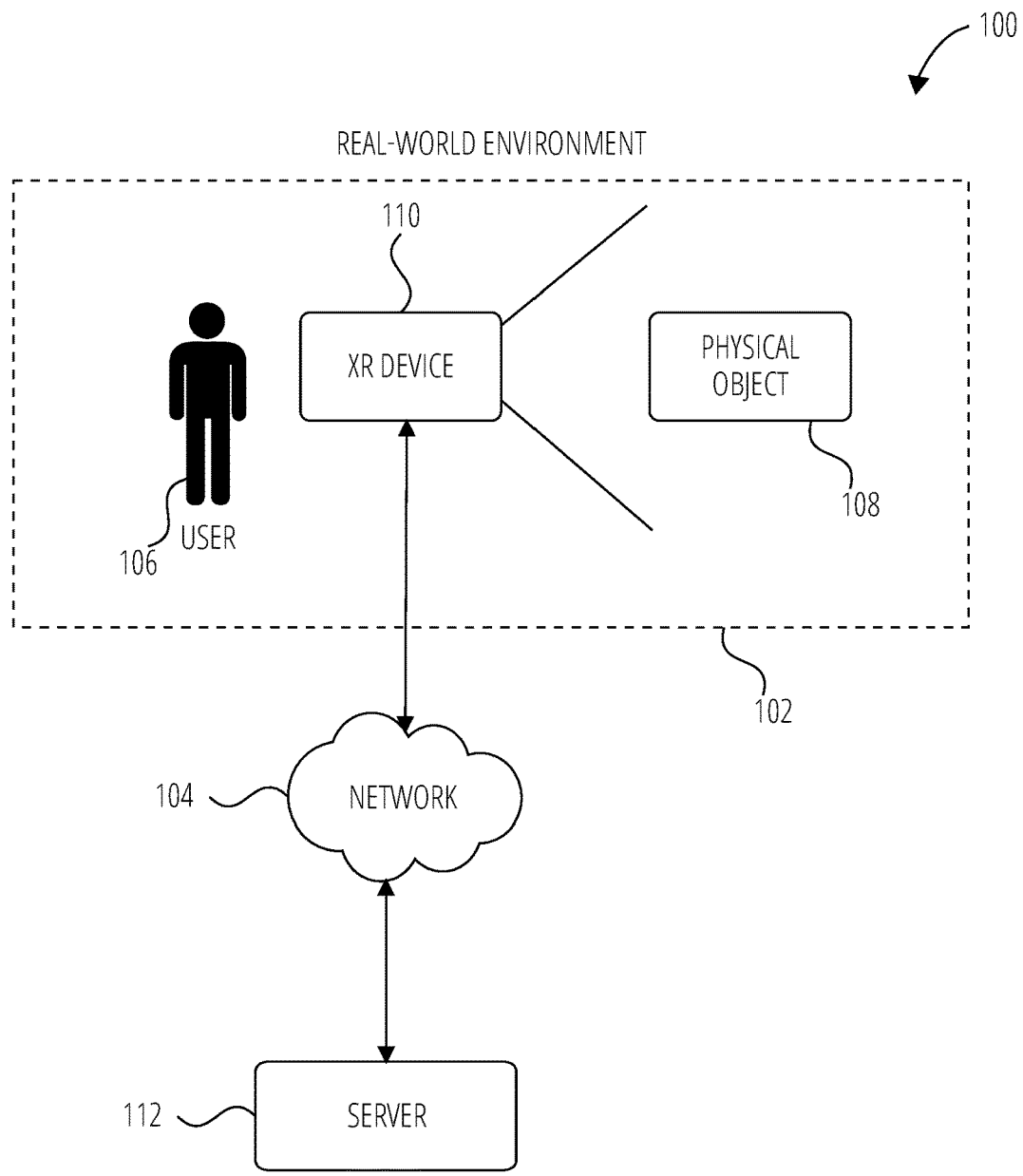
FIG. 1 is a block diagram illustrating a network environment for operating an XR device, according to some examples.

The term "augmented reality" (AR) is used herein to refer to an interactive experience of a real-world environment where physical objects or environments that reside in the real world are "augmented" or enhanced by computer-generated digital content (also referred to as virtual content or synthetic content). AR can also refer to a system that enables a combination of real and virtual worlds, real-time interaction, and three-dimensional registration of virtual and real objects. A user of an AR system can perceive virtual content that appears to be attached or interact with a real-world physical object. The term "AR application" is used herein to refer to a computer-operated application that enables an AR experience.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment. While examples described in the present disclosure focus primarily on XR devices that provide an AR experience, it will be appreciated that aspects of the present disclosure may also be applied to other types of XR experiences, such as VR experiences.

The term "user session" is used herein to refer to an operation of an application during periods of time. For example, a user session may refer to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In another example, the session starts when the user runs or starts an AR application, or runs or starts a particular feature of the AR application, and stops when the user ends the AR application or stops the particular features of the AR application.

As mentioned above, the placement of virtual content in suitable positions, from the perspective of the user, is an important aspect of providing an XR experience. This can be particularly important, for example, in the context of pervasive AR. The term "pervasive AR," also known as "ubiquitous AR," refers to AR experiences becoming part of (or increasingly part of) everyday life. For example, in pervasive AR, a user might wear a head-wearable AR device (e.g., AR glasses) for most of the day, and use the head-wearable AR device for tasks that would traditionally be associated with a smartphone or personal computer, e.g., to interact with others via messaging functionality and to obtain information (e.g., information about the weather, time, news, sports, or navigation) as the user is going about daily life. AR devices usually have limited display space, creating the risk of information overload or the occlusion of important real-world information, potentially hampering continuous use of such devices.

The use of widgets can be an effective way of presenting information to a user, particularly where display space is limited. For example, a user may wish to see baseball scores for only one team. A sport scores widget extracts the relevant baseball scores, e.g., from an application or online source, and displays it to the user. As another example, a user may not want to read a detailed weather forecast, but would rather see only key data points, such as the temperature and forecast. Weather data can be compiled in a weather application and regularly updated, with a weather widget being configured to display only the specific data that the user wishes to see.

Examples described herein provide techniques for smart virtual content placement, e.g., the smart placement of virtual content widgets that provide information to a user as part of an AR experience. These techniques may obviate or minimize the risks referred to above to facilitate realization of more continuous usage of AR devices, or even facilitate the move towards pervasive AR.

In some examples, a virtual content widget is dynamically placed and presented where a user needs it and without causing significant distractions or occlusions. An XR device may access sensor data from one or more sensors, e.g., optical sensors, depth sensors, inertial sensors, or eye tracking sensors. User context associated with the user of the XR device is determined based on the sensor data, and the user context is analyzed to determine, or assist in determining, a widget location for placing the virtual content widget.

As used herein, the term "user context" refers to information that relates to the current state, environment, behavior, preferences, or interactions of a user of an XR device, or combinations thereof. User context may, for example, include one or more of:

Activity context: data relating to the user's current action or a current task being performed during a user session, such as walking, sitting, reading, shopping, working, or the like.

Behavioral context: data relating to the user's interactions with respect to, or associated with, the XR device, such as gestures, movements, gaze direction, head orientation, user selections, or other behavioral cues.

Location context: data relating to the user's location and position relative to a surrounding environment, as determined by the XR device.

Environmental context: data relating to the real-world environment in which the user is situated, including data about physical objects, object types, relevance of objects identified by the XR device, surfaces or planes in the real-world environment, light conditions, sounds, temperature, or other environmental factors that can be sensed or inferred.

Temporal context: a time of day, a day of the week, season, user session duration, past user session durations, and so forth.

Physiological context: data relating to a physical state of the user, such as heart rate, eye movement, or other biometric data captured or accessed by the XR device.

In some examples, a virtual content widget is identified for presentation to the user and the widget location is selected based at least partially on the user context. The XR device causes presentation, via a display component, of the virtual content widget at the widget location. By taking into account various aspects of user context, the XR device can dynamically place virtual content, such as virtual content widgets, based on a user's needs, current focus, and expectations, in a more nuanced and effective way. In some examples, a virtual content widget is specifically located outside of a primary focus area of the user in order to reduce the risk of distractions or occlusions.

The XR device may detect that a current user context matches a widget placement trigger. Presentation of the virtual content widget may be caused responsive to determining that the user context matches the widget placement trigger. Widget placement may be triggered by a specific user action or other user context, such as detection of a certain user activity or a real-world object.

In some examples, the widget location is selected such that the virtual content widget is presented to the user as overlaid on a real-world object. Examples described herein allow for accurate placement of virtual content, e.g., alignment of a virtual content widget with a particular target surface in such a way that the virtual content widget is useful to the user, but without causing a significant distraction, occlusion of relevant real-world objects, or user discomfort.

Techniques described herein may be employed to render and present various types of virtual content, such as virtual content widgets or other informational content items (e.g., notifications, reminders, or alerts). Various techniques are described for implementing dynamic placement of virtual content. These techniques include orientation-guided placement, world-aligned placement, and object-aware placement. In some examples, combinations of these techniques may be employed by an XR device.

Orientation-guided placement techniques are based on the user providing a widget-activation gesture, e.g., by looking towards a specific zone or in a specific direction to access information. For example, when using an XR device, a user may normally look horizontally and forward, while looking directly down towards the ground is a more uncommon movement pattern, e.g., the user may look down only in isolated cases, such as when the user specifically wishes to examine a ground or floor area of their environment. A ground or floor area also often does not contain any highly important elements, e.g., information used to perform tasks. Thus, in some examples, the XR device identifies a specific widget-activation gesture, such as a downward-looking action, as a widget placement trigger, and this causes dynamic placement of a virtual content widget. As described further below, in some examples, the virtual content widget is dynamically presented on a plane located in front of the user and below a user eye level.

World-aligned placement techniques are based on identifying suitable locations around the user of an XR device that can be used for placing virtual content widgets, without occluding any relevant information. For example, and as described further below, walls, wall-like structures, or other upright surfaces that do not contain relevant information may be identified for dynamic placement of virtual content widgets. In this way, virtual content widgets may be presented in useful positions without occluding relevant information and/or while avoiding dynamic objects, such as a user's conversation partner, pedestrians, or cars.

Object-aware placement techniques involve automatically detecting, by the XR device, a real-world object that is associated with specific information. For example, the XR device may identify a clock in a real-world environment of the user and, in response thereto, cause placement of a calendar widget such that it appears overlaid on, or adjacent to, the clock. As another example, a television may be associated with a news widget, with detection of a television causing display of a news widget at an associated widget location. Relationships between real-world objects and widgets may be predefined or may be dynamically set or adjusted based on user preferences.

In conventional XR systems, informational content, such as widgets or notifications, may be placed in a static or predefined manner without tailoring presentation to user context. For example, a set of widgets may always be presented to the user in the same relative position, e.g., directly in front of the user or in a fixed three-dimensional arrangement relative to the user. Dynamic placement of virtual content based on user context may address technical issues caused or exacerbated by these conventional approaches, for example, by reducing information overload, clutter, user discomfort, attention tunneling, or the risk of occlusion of real-world features.

By considering user context, such as real-world surroundings of the user and tasks performed by the user, virtual content widgets can be dynamically placed and updated in a context-aware manner, thereby improving the functioning of a computing device, especially user interfaces or user experiences provided by XR devices. Techniques described herein may facilitate continuous usage of XR devices or usage for longer periods of time. Further, in some examples, an XR device that presents virtual content in this manner may also be safer to use in dynamic or busy settings.

One or more of the methodologies described herein may obviate a need for certain efforts or computing resources, e.g., as a result of automated arrangement of virtual content elements and thus reduced requirements for user interactions or user selections. Examples of such computing resources include processor cycles, network traffic, memory usage, data storage capacity, power consumption, network bandwidth, and cooling capacity.

Other technical features may be readily apparent to one skilled in the art from the following figures, descriptions, examples, and claims. The description herein describes systems, methods, techniques, instruction sequences, and/or computing machine program products that illustrate examples of the present subject matter. In the description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

FIG. 1 is a network diagram illustrating a network environment 100 suitable for operating an XR device 110, according to some examples. The network environment 100 includes an XR device 110 and a server 112, communicatively coupled to each other via a network 104. The XR device 110 and the server 112 may each be implemented in a computer system, in whole or in part, as described below with respect to FIG. 12. The server 112 may be part of a network-based system. For example, the network-based system may be or include a cloud-based server system that provides additional information, such as virtual content (e.g., two-dimensional or three-dimensional models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

The XR device 110 may have different display arrangements. In some examples, the display arrangement may include a screen that displays what is captured with a camera of the XR device 110. In other examples, the display of the device may be transparent or semi-transparent. In other examples, the display may be non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional physical object (e.g., a picture), a three-dimensional physical object (e.g., a statue), a location (e.g., at factory), or any references (e.g., perceived corners of walls or furniture, or QR codes) in the real-world physical environment. For example, the user 106 may point a camera of the XR device 110 to capture an image of the physical object 108 and a virtual overlay may be presented over the physical object 108 via the display. As described in more detail elsewhere, the XR device 110 may also present information content items, such as virtual content widgets, to the user 106 during a user session. Experiences may also be triggered or enhanced by a hand or other body part of the user 106, e.g., the XR device 110 may detect and respond to hand gestures.

The XR device 110 includes tracking components (not shown in FIG. 1). The tracking components track the pose (e.g., position, orientation, and location) of the XR device 110 relative to a real-world environment 102 using image sensors (e.g., depth-enabled three-dimensional camera, and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102.

In some examples, the server 112 may be used to detect and identify the physical object 108 based on sensor data (e.g., image and depth data) from the XR device 110, and determine a pose of the XR device 110 and the physical object 108 based on the sensor data. The server 112 can also generate a virtual object based on the pose of the XR device 110 and the physical object 108.

In some examples, the server 112 communicates a virtual object to the XR device 110. The XR device 110 or the server 112, or both, can also perform image processing, object detection, and object tracking functions based on images captured by the XR device 110 and one or more parameters internal or external to the XR device 110. The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
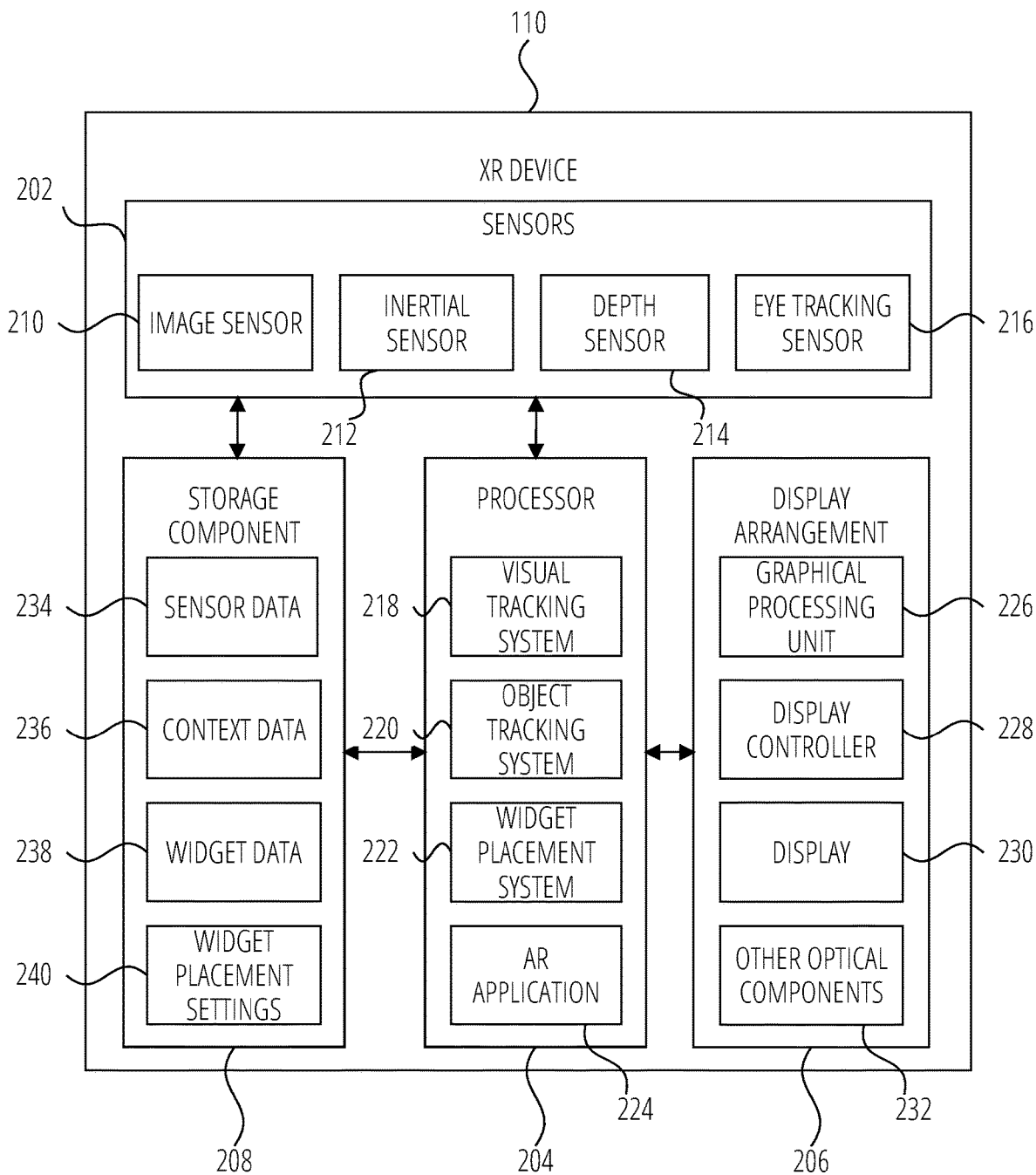
FIG. 2 is a block diagram illustrating components of an XR device, according to some examples.

FIG. 2 is a block diagram illustrating components (e.g., parts, modules, or systems) of the XR device 110, according to some examples. The XR device 110 includes sensors 202, a processor 204, a display arrangement 206, and a storage component 208. It will be appreciated that FIG. 2 is not intended to provide an exhaustive indication of components of the XR device 110.

The sensors 202 include one or more image sensor 210, one or more inertial sensor 212, one or more depth sensor 214, and one or more eye tracking sensor 216. The image sensor 210 may include, for example, a combination of a color camera, a thermal camera, a depth sensor, and one or multiple grayscale, global shutter tracking cameras. The inertial sensor 212 may be a combination of a gyroscope, accelerometer, and a magnetometer. In some examples, the inertial sensor 212 includes one or more Inertial Measurement Unit (IMU). An IMU enables tracking of movement of a body by integrating the acceleration and the angular velocity measured by the IMU. The term "IMU" can refer to a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement.

The depth sensor 214 may include a combination of a structured-light sensor, a time-of-flight sensor, passive stereo sensor, and an ultrasound device. The eye tracking sensor 216 is configured to monitor the gaze direction of the user, providing data for various applications, such as adjusting the focus of displayed content, or determining a zone or object which the user 106 may be looking at or interested in. The XR device 110 may include one or multiple of these sensors, e.g., image-based or video-based tracking sensors, such as infrared eye tracking sensors or corneal reflection tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and possible sensors of an XR device are thus not limited to the ones described above.

The processor 204 implements a visual tracking system 218, an object tracking system 220, a widget placement system 222, and an AR application 224. The visual tracking system 218 estimates and continuously tracks a pose of the XR device 110. For example, the visual tracking system 218 uses data from the image sensor 210 and the inertial sensor 212 to track a location and pose of the XR device 110 relative to a frame of reference (e.g., real-world environment 102). In some examples, the visual tracking system 218 uses sensor data 234 stored in the storage component 208 to determine the three-dimensional pose of the XR device 110. The three-dimensional pose is a determined orientation and position of the XR device 110 in relation to the user's real-world environment 102. The visual tracking system 218 continually gathers and uses updated sensor data describing movements of the XR device 110 to determine updated three-dimensional poses of the XR device 110 that indicate changes in the relative position and orientation of the XR device 110 from the physical objects (real-world objects) in the real-world environment 102. The visual tracking system 218 may provide the three-dimensional pose of the XR device 110 to a graphical processing unit 226 of the display arrangement 206.

A "SLAM" (Simultaneous Localization and Mapping) system may be used to understand and map a physical environment in real-time. This allows the XR device 110, for example, to accurately place digital objects overlaid, or superimposed, on the real world and track their position as a user moves and/or as objects move. The XR device 110 may include a "VIO" (Visual-Inertial Odometry) system that combines data from an IMU and a camera to estimate the position and orientation of an object in real-time. In some examples, a VIO system may form part of a SLAM system, e.g., to perform the "Localization" function of the SLAM system.

The object tracking system 220 enables the detection and tracking of an object, e.g., the physical object 108, or a hand of a user. The object tracking system 220 may include a computer-operated application or system that enables a device or system to detect and track visual features identified in images captured by one or more image sensors, such as one or more cameras. In some examples, the object tracking system builds a model of a real-world environment based on the tracked visual features. An object tracking system may implement one or more object tracking machine learning models to track an object in the field of view of a user during a user session. The object tracking machine learning model may comprise a neural network trained on suitable training data to identify and track objects in a sequence of frames captured by the XR device 110. The machine learning model may, in some examples, be known as a core tracker. A core tracker is used in computer vision systems to track the movement of an object in a sequence of images or videos. It typically uses an object's appearance, motion, landmarks, and/or other features to estimate location in subsequent frames.

The widget placement system 222 is configured to enable dynamic and accurate placement of virtual content, such as widgets or other information items (e.g., notifications), in the field of view of the XR device 110 to enrich or enhance the XR experience of the user 106. In the context of virtual content widgets, examples of virtual content include a weather widget, a time widget, a calendar widget, a messaging widget (e.g., displaying message notifications), a news widget (e.g., a sports scores widget), a financial widget, a navigation widget, or a media widget, such as a social media feed widget. The widget placement system 222 identifies suitable or relevant widgets, dynamically selects widget locations, and causes widgets to be presented to the user 106 at the selected widget locations. As is described in greater detail elsewhere, in some examples, the widget placement system 222 is specifically configured such that virtual content widgets can be dynamically placed in a context-aware manner, alleviating potential issues such as information overload, user discomfort, attention tunneling, or occlusion of real-world features.

The AR application 224 may retrieve virtual objects (e.g., a three-dimensional object model, or a model of a widget identified for placement by the widget placement system 222). Virtual objects may be retrieved based on an identified physical object 108 or physical environment (or other real-world feature) or based on other aspects of user context. The AR application 224 may also retrieve an augmentation to apply to real-world features, such as the physical object 108. The graphical processing unit 226 causes display of the virtual object, augmentation, or the like. The AR application 224 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

The graphical processing unit 226 may include a render engine that is configured to render a frame of a model of a virtual object based on the virtual content provided by the AR application 224 and the pose of the XR device 110 (and, in some cases, the position of a tracked object). In other words, the graphical processing unit 226 uses the three-dimensional pose of the XR device 110 and other data, as may be required, to generate frames of virtual content to be presented on a display 230. For example, the graphical processing unit 226 uses the three-dimensional pose to render a frame of the virtual content such that the virtual content is presented at an orientation and position in the display 230 to properly augment the user's reality. As an example, the graphical processing unit 226 may use the three-dimensional pose data to render a frame of virtual content such that, when presented on the display 230, the virtual content is caused to be presented to a user so as to overlap with a physical object in the user's real-world environment 102. As described with reference to examples below, the virtual content may include virtual content widgets. The graphical processing unit 226 can generate updated frames of virtual content based on updated three-dimensional poses of the XR device 110 and updated tracking data generated by the abovementioned tracking components, which reflect changes in the position and orientation of the user in relation to physical objects in the user's real-world environment 102, thereby resulting in a more immersive experience.

The graphical processing unit 226 transfers a rendered frame to a display controller 228. The display controller 228 is positioned as an intermediary between the graphical processing unit 226 and the display 230, receives the image data (e.g., rendered frame) from the graphical processing unit 226, re-projects the frame (e.g., by performing a warping process) based on a latest pose of the XR device 110 (and, in some cases, object tracking pose forecasts or predictions), and provides the re-projected frame to the display 230. The display arrangement 206 may include one or more other optical components 232, such as mirrors, lenses, and so forth, depending on the implementation.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps or operations may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, three-dimensional view. Thus, while a single set of display arrangement components, or a single set of output images, may be discussed to describe some examples, similar techniques may be applied to cover both eyes by providing a further set of display arrangement components.

The storage component 208 may store various data, such as the sensor data 234 referred to above, as well as context data 236, widget data 238, and widget placement settings 240. The sensor data 234 may include data obtained from one or more of the sensors 202, e.g., images captured using the image sensor 210 or eye tracking data from the context data 236. Context data 236 may include information that relates to, describes, or identifies a user context of the user 106, e.g., the current state, environment, behavior, preferences, or interactions of the user 106. At least some of the context data 236 may be obtained or derived from sensor data 234 originating from the one or more sensors 202. For example, context data 236 indicating a current user activity and the types of objects detected in the real-world environment 102 may be generated based on the sensor data 234 describing the movements of the user and the objects present in the real-world environment 102.

The widget data 238 may include details of a set of widgets associated with the user 106 or with the XR device 110. The widgets may be specifically selected by the user 106, preselected or activated by default, suggested to the user 106 by the XR device 110, or combinations thereof. The widget data 238 may include details of information to present when a particular virtual content widget is displayed. Widget placement settings 240 may include settings or rules to be followed by the processor 204 in monitoring or analyzing user context for widget placement. For example, the widget placement settings 240 may include widget placement triggers that prescribe user context (e.g., specific gestures, events, objects, or other context) that triggers the placement of specific widgets. For example, the widget placement settings 240 may identify a set of real-world objects, each associated with a particular virtual content widget, such that when a particular real-world object is detected by the XR device 110, the associated virtual content widget is triggered. In some cases, a virtual content widget is triggered if an object type of the real-world object matches or corresponds to a widget type of the virtual content widget. The widget placement settings 240 may further identify one or more widget-activation gestures. When the user 106 performs a particular gesture, this may trigger placement and presentation of a corresponding virtual content widget.

Any one or more of the components described herein may be implemented using hardware (e.g., a processor of a machine) or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices. A component may be implemented at the XR device, or server-side, or both at the XR device and server-side, depending on the component and design.

Figure 3:
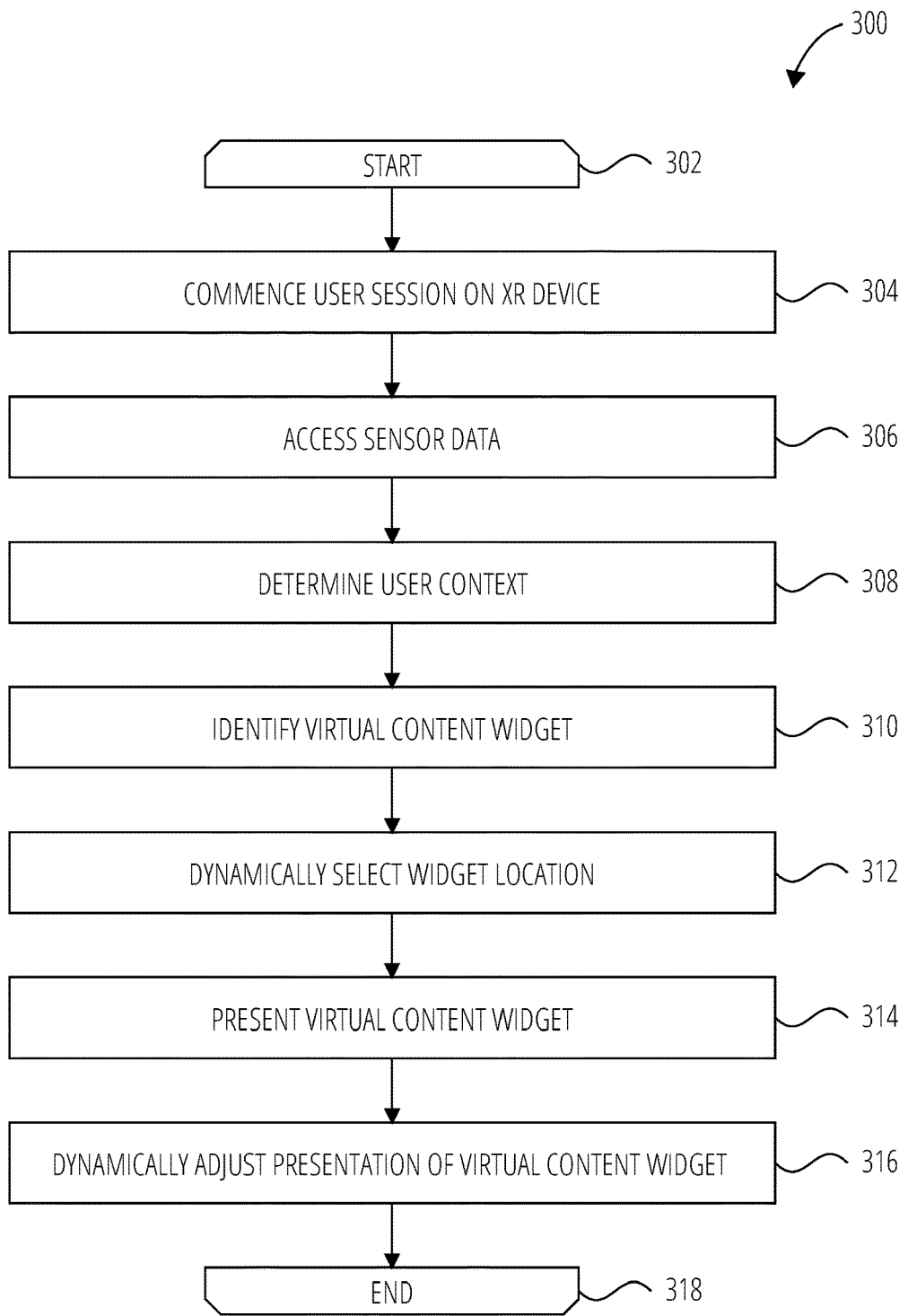
FIG. 3 is a flowchart illustrating a method suitable for dynamic placement of a virtual content widget by an XR device, according to some examples.

FIG. 3 is a flowchart illustrating a method 300 suitable for dynamic and selective placement of a virtual content widget by an XR device, according to some examples. Operations in the method 300 may be performed by an XR device using components (e.g., parts, modules, systems, or engines) described above with respect to FIGS. 1 and 2. Accordingly, by way of example and not limitation, the method 300 is described with reference to the XR device 110 and certain components thereof. However, it shall be appreciated that at least some of the operations of the method 300 may be deployed on various other hardware configurations or be performed by similar components residing elsewhere. The term "operation" is used to refer to elements in the drawings of this disclosure for ease of reference and it will be appreciated that each "operation" may identify one or more operations, processes, actions, or steps, and may be performed by one or multiple components.

The method 300 commences at opening loop element 302 and proceeds to operation 304, where the XR device 110 starts a user session. For example, the XR device 110 may be a head-wearable device, such as AR glasses, and the user 106 may put on the XR device 110 and use the XR device 110 to access an XR experience. The XR device 110 may be used for various purposes, including interacting with others, interacting with real-world objects and/or virtual content rendered by the XR device 110, obtaining and sharing information, creating and sharing content, performing transactions, playing games, and so forth.

During the user session, the XR device 110 obtains data from the various sensors 202, as described above. The XR device 110 may also obtain stored data from one or more previous user sessions. The sensor data 234 may include, for example, optical sensor data, depth sensor data, eye tracking sensor data, inertial sensor data, and so forth. The relevant sensor data 234 is accessed (operation 306) and processed to determine user context associated with the user 106 (operation 308).

The widget placement system 222 of the XR device 110 identifies a virtual content widget for presentation to the user 106, at operation 310. The widget placement system 222 uses the user context, e.g., a current user activity together with details of real-world objects in the field of view of the XR device 110, to dynamically select a widget location (operation 312). Once the widget location has been selected, at operation 314, a virtual content widget is presented to the user 106 at the widget location, e.g., using display components of the display arrangement 206 of FIG. 2. Specific non-limiting examples of user context, and the manner in which user context may be utilized for smart placement of virtual content, are described below with reference to FIGS. 4-9.

Various components may be used to accurately place the virtual content widget. The widget location may be selected such that, from the perspective of the user 106, the virtual content widget appears overlaid on, or appears adjacent to, a particular object or surface. Thus, in some examples, the virtual content widget may appear from the perspective of the user as being "attached" to the relevant object or surface. The XR device 110 may use sensor data 234, such as depth sensor data, as well as pose data of the XR device 110, to calculate the appropriate positioning and scaling for the virtual content widget such that it appears overlaid or superimposed on the real-world environment 102 in a realistic or convincing manner. Different levels of transparency may be applied such that objects behind the virtual content widget remain at least partially visible to the user. Optical components such as RGB cameras may be used to match the lighting and shading of the real-world environment 102 to the extent that it may be required. This ensures that the virtual content widget appears substantially as though it is part of the real-world scene, or such that it does not appear "out of place," thus enhancing the overall XR experience.

Referring more specifically to the widget location, techniques such as ray casting and plane/surface detection may be employed to facilitate accurate positioning and/or placement. Referring firstly to ray casting, the XR device 110 may use one or more of its sensors 202 to understand and map the surroundings of the user 106. For example, the XR device 110 may create a three-dimensional representation, such as a mesh or point cloud of the real-world environment 102. A ray casting algorithm may "shoot" rays from the XR device 110 into the three-dimensional representation. When a ray collides with a surface, it may be registered as an impact point or anchor point. Once a particular surface is identified, the XR device 110 may calculate the exact position and orientation at which to place the virtual content widget, e.g., aligned with the surface so as to appear essentially as a "poster" on the surface. The graphical processing unit 226 then renders the image of the virtual content widget using the position and orientation data originating from the ray casting operation.

When utilizing plane/surface detection, similar to the ray casting, the XR device 110 creates at least a partial map of the real-world environment 102. A plane detection algorithm may then be executed to scan the map for specific planes, e.g., flat surfaces where all points are at nearly the same level. The XR device 110 may utilize plane detection to identify a particular surface, and then proceed as above to render, position, and orient the virtual content widget.

The presentation of the virtual content widget is dynamically adjusted and updated to accommodate motion of the user 106 and/or motion of real-world objects, at operation 316. In some examples, one or more virtual content widgets displayed to the user 106 are adjusted based on the user context, as described further with reference to FIGS. 4-9. As an example, the XR device 110 may continuously track its pose (position and orientation relative to the real-world environment 102), and update the widget location (e.g., the location where the virtual content widget is to be presented to the user 106) based on changes in the tracked pose of the XR device 110. The method 300 concludes at closing loop element 318.

Orientation-Guided Placement

Figure 4:
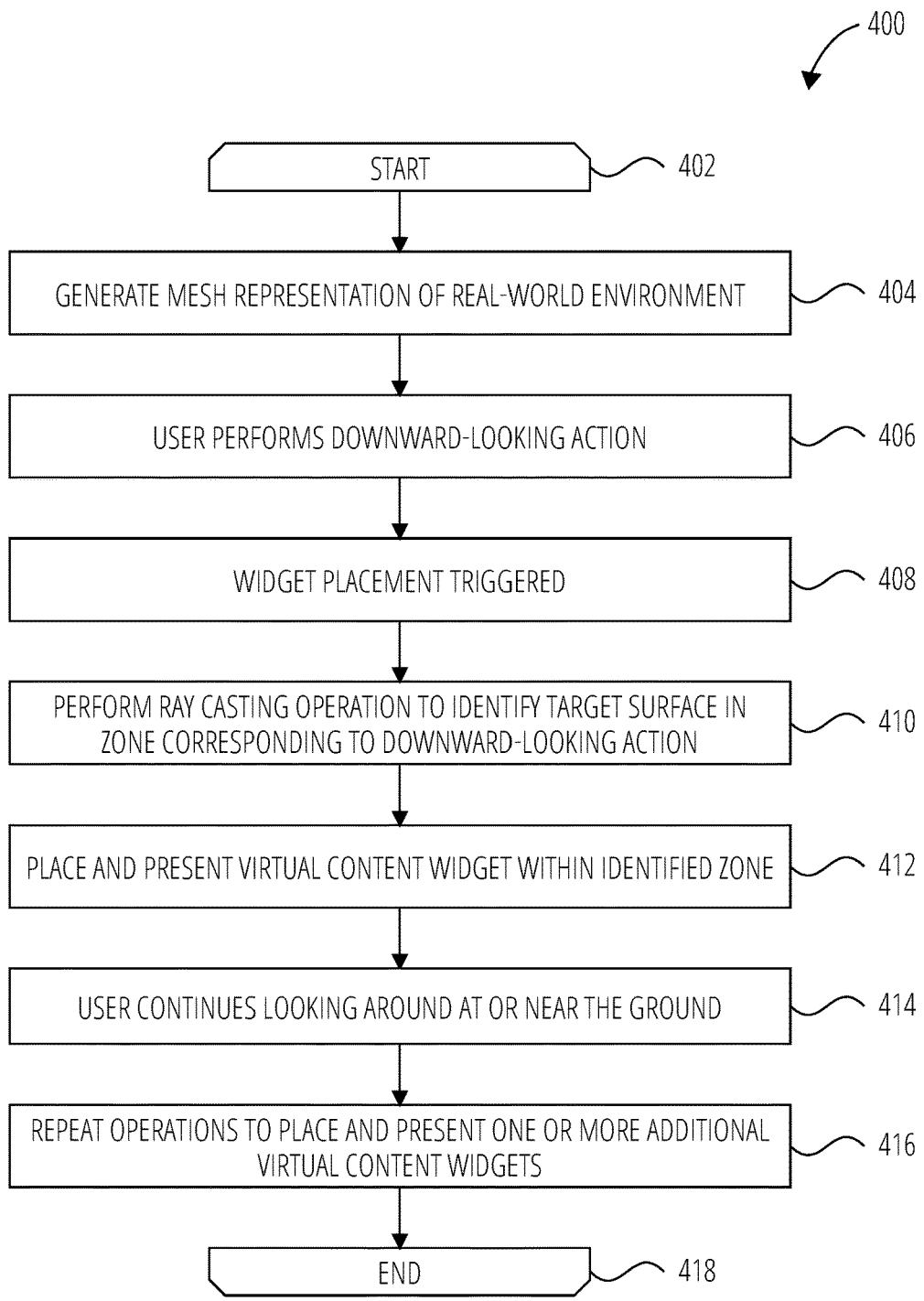
FIG. 4 is a flowchart illustrating a method suitable for dynamic placement of a virtual content widget by an XR device, according to some examples, in which an orientation-guided placement technique is implemented.

FIG. 4 is a flowchart illustrating a method 400 suitable for dynamic placement of a virtual content widget by an XR device, according to some examples, in which an orientation-guided placement technique is implemented. Operations in the method 400 may be performed by an XR device using components (e.g., parts, modules, systems, or engines) described above with respect to FIGS. 1 and 2. Accordingly, by way of example and not limitation, the method 400 is described with reference to the XR device 110 and certain components thereof. The method 400 is further described with reference to a scene 500 depicted in FIG. 5 to illustrate the manner in which orientation-guided placement can be performed by the XR device 110, according to some examples. However, it shall be appreciated that at least some of the operations of the method 400 may be deployed on various other hardware configurations or be performed by similar components residing elsewhere, and that the operations may be applied in different scenes and user scenarios.

As mentioned, in some examples, the orientation-guided placement technique utilizes a predefined widget-activation gesture. In the method 400, the XR device 110 is a head-wearable device, and a downward-looking action performed by the user 106, while wearing the XR device 110 during a user session, is defined as the widget-activation gesture. The technique may thus be regarded as "orientation-guided," as the orientation of the body of the user 106, and specifically the head of the user 106, is tracked to trigger widget placement.

Figure 5:
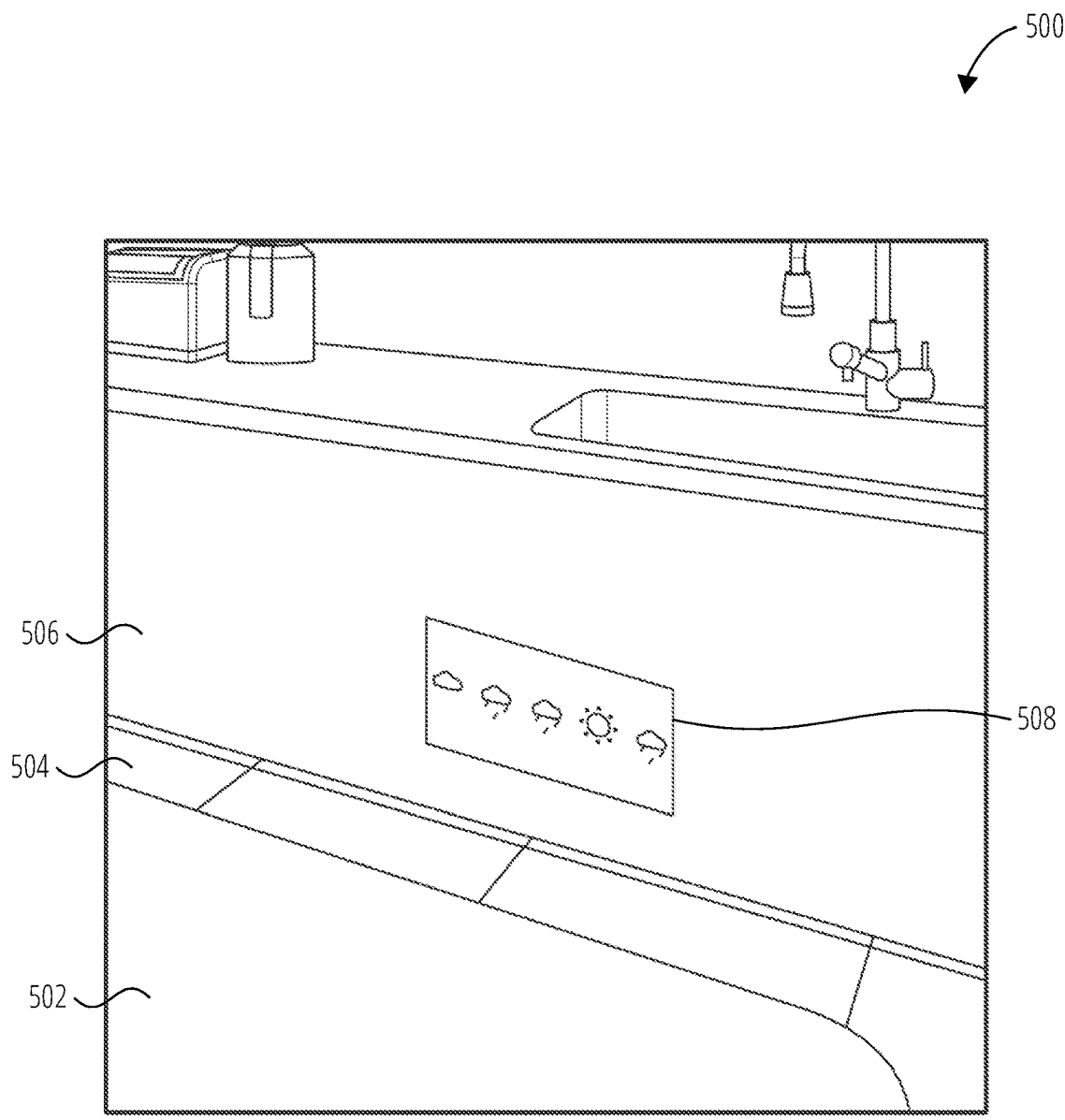
FIG. 5 is a perspective view of a scene viewed by a user of an XR device, according to some examples, in which a virtual content widget is overlaid on a target surface of a real-world environment.

The method 400 commences at opening loop element 402 and proceeds to operation 404, where the XR device 110 generates and dynamically updates a three-dimensional representation of the real-world environment 102, e.g., a mesh representation. Referring to FIG. 5, the three-dimensional representation is a representation of the real-world scene 500, e.g., a kitchen where the user 106 is sitting at a kitchen table 502. The XR device 110 uses the three-dimensional representation as well as the tracked pose of the XR device 110 to analyze or track the head orientation of the user 106 relative to the ground plane. The XR device 110 may also use one or more other sensors 202, e.g., the eye tracking sensor 216 to track a gaze of the user 106 or the image sensor 210 to track visual features in the scene 500.

At operation 406, the user 106 performs the downward-looking action during a user session. Referring to FIG. 5, the user 106 may be sitting at the kitchen table 502 and look down towards a floor 504 by tilting their head downwards. The XR device 110 detects the downward-looking action as user context matching a widget-activation gesture, and this triggers widget placement (operation 408). The widget placement system 222 may identify the downward-looking action and, in response, initiate the placement of one or more suitable virtual content widgets, as described below.

At operation 410, the XR device 110 performs a ray casting operation to identify a target surface in the zone corresponding to the downward-looking action. To identify suitable surfaces, one or more rays may be cast into the three-dimensional representation, e.g., a "center eye ray" can be cast forward from the center of the field of view of the user 106. The ray casting operation is used to identify a target surface that meets one or more predefined conditions. In the example of FIG. 4, the conditions are that the target surface is a substantially upright surface, and the target surface is located at or near the ground or floor area to correspond with the downward-looking action (e.g., it is below a user eye level). Further conditions may include that the target surface is substantially clear of important information (e.g., words or images) and no other virtual content item has been rendered (or is to be rendered) at or near the proposed widget location.

As shown in FIG. 5, the XR device 110 identifies an upright surface 506 near the floor 504 as a suitable target surface and selects the widget location on the target surface. The method 400 proceeds to operation 412, where the virtual content widget 508 is then placed within the identified zone, e.g., overlaid on and aligned with the upright surface 506. In the example of FIG. 5, the virtual content widget 508 is a weather widget. The virtual content widget 508 may be overlaid on the upright surface 506 such that the upright surface 506 is not visible behind the virtual content widget 508, or a degree of transparency may be utilized when rendering the virtual content widget 508 to keep the upright surface 506 partially visible behind the virtual content widget 508.

It will be appreciated that multiple virtual content widgets may be placed in this manner. For example, and as shown in FIG. 4 at operation 414, the user 106 may continue looking around at or near the ground area or floor 504. The XR device 110 may then use the same techniques to place one or more further virtual content widgets (operation 416) and present them as overlaid on the upright surface 506, provided that the relevant conditions are met. For example, the XR device 110 may ensure that virtual content widgets do not overlap with each other in the field of view, that virtual content widgets are spaced apart from each other by a predefined distance, and/or that no more than a threshold number of virtual content widgets are presented at the same time or on the same plane.

In some examples, the virtual content widget 508 may continue to be displayed at appropriate times until the XR device 110 detects a change in user context. The user 106 may look up to another part of the scene 500, causing the virtual content widget 508 to be temporarily removed from the display 230, with the virtual content widget 508 being re-rendered and presented in substantially the same position if the user 106 looks back at the upright surface 506. However, the XR device 110 may subsequently detect the user 106 getting up from the kitchen table 502 and starting to walk to another room, and thus stop presentation of the virtual content widget 508 (e.g., cease a widget presentation mode). The method 400 ends at closing loop element 418.

The orientation-guided placement technique, as described with reference to FIG. 4 and FIG. 5, may thus involve user-driven information placement and the smart placement of information to avoid occlusion or user distraction. For example, the user 106 may be in a discussion with a group of people, making it undesirable to display virtual content as superimposed on the people in the scene. The orientation-guided placement technique may ensure that a virtual content widget is presented in response to a widget-activation gesture, while being positioned in a manner that avoids one or more of these potential issues.

World-Aligned Placement

Figure 6:
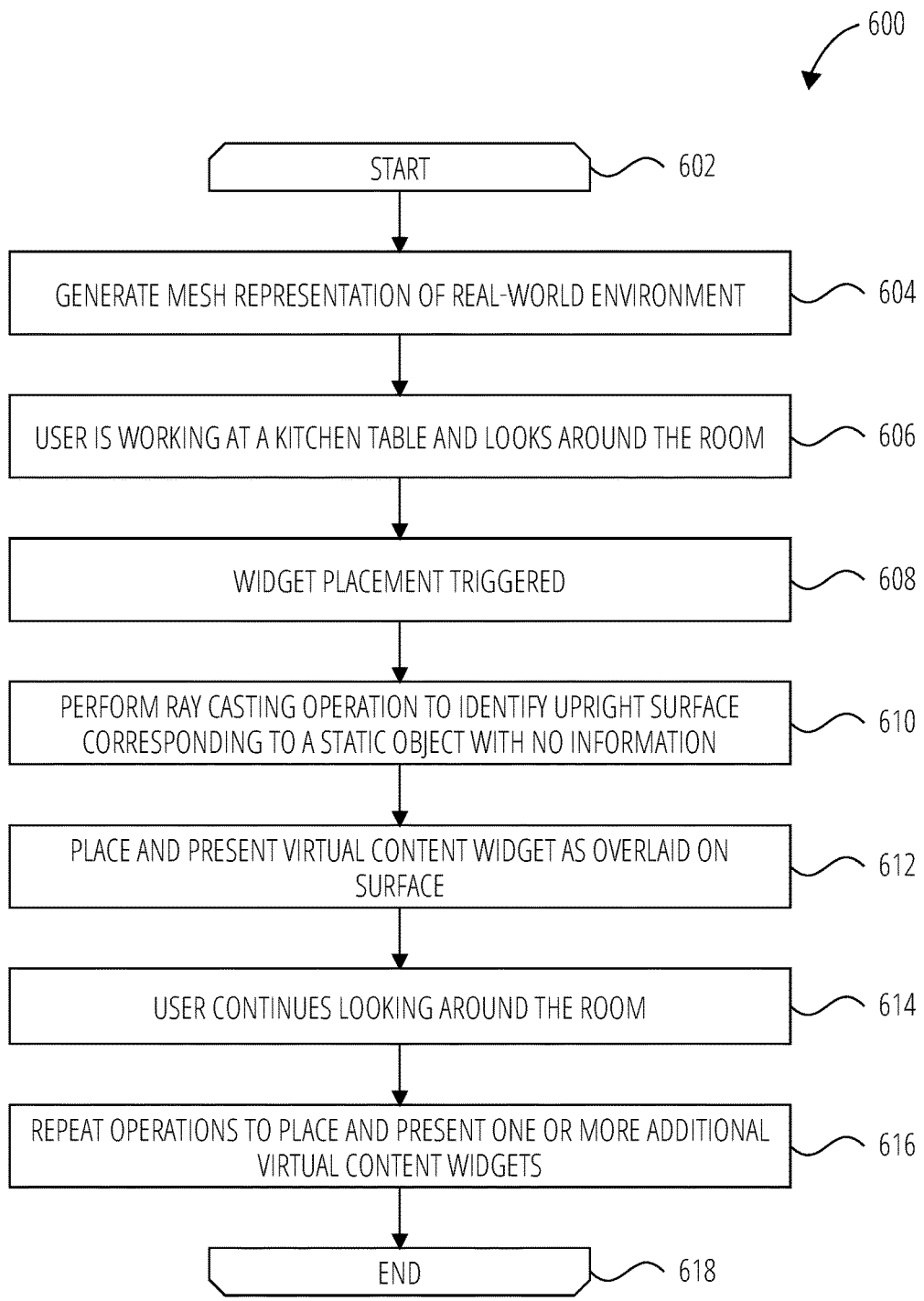
FIG. 6 is a flowchart illustrating a method suitable for dynamic placement of a virtual content widget by an XR device, according to some examples, in which a world-aligned placement technique is implemented.

FIG. 6 is a flowchart illustrating a method 600 suitable for dynamic placement of a virtual content widget by an XR device, according to some examples, in which a world-aligned placement technique is implemented. Operations in the method 600 may be performed by an XR device using components (e.g., parts, modules, systems, or engines) described above with respect to FIGS. 1 and 2. Accordingly, by way of example and not limitation, the method 600 is described with reference to the XR device 110 and certain components thereof. The method 600 is further described with reference to a scene 700 depicted in FIG. 7 to illustrate the manner in which world-aligned placement can be performed by the XR device 110, according to some examples. However, it shall be appreciated that at least some of the operations of the method 600 may be deployed on various other hardware configurations or be performed by similar components residing elsewhere, and that the operations may be applied in different scenes and user scenarios.

Figure 7:
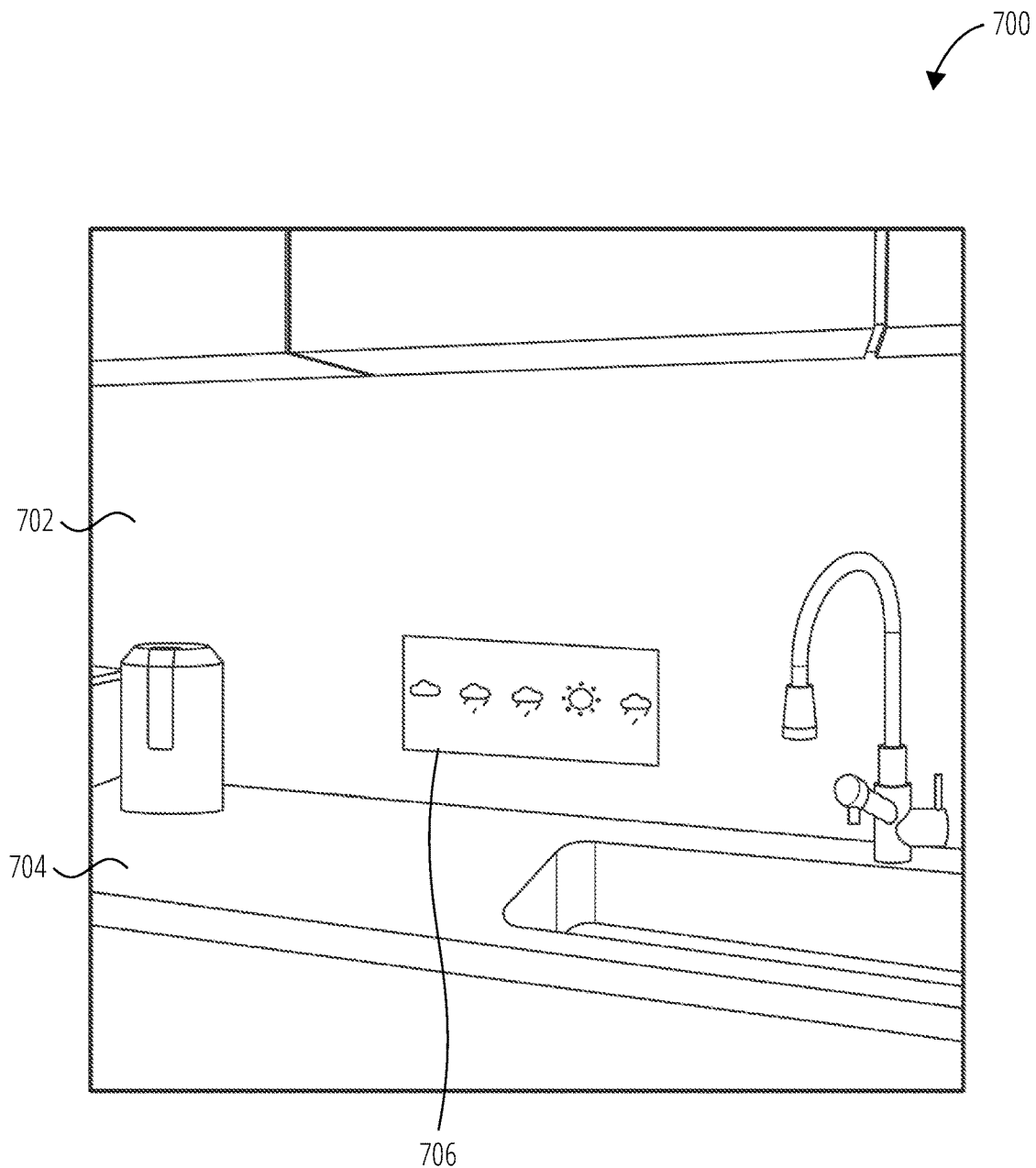
FIG. 7 is a perspective view of a scene viewed by a user of an XR device, according to some examples, in which a virtual content widget is overlaid on a target surface of a real-world environment.

In some examples, the world-aligned placement technique is implemented to place information items, such as widgets or notifications, at suitable locations around the user 106 without an explicit widget-activation gesture. The method 600 commences at opening loop element 602 and proceeds to operation 604, where a three-dimensional representation of the real-world environment 102, e.g., the scene 700 depicted in FIG. 7, is generated and dynamically updated, as described above.

The user 106 is, for example, working at a kitchen table and then looks around the room, bringing the upright surface 702 above the counter 704 into the field of view (operation 606) and triggering widget placement (operation 608).

The XR device 110 analyzes the environmental context of the user 106, including the geometry of the surrounding environment. The widget placement system 222 is configured to detect plain walls or wall-like structures without salient elements or information. For example, while browsing the scene 700, the XR device 110 may build up a three-dimensional representation of the scene 700 and compute suitable, or possibly suitable, placement locations for virtual content widgets, e.g., by ray casting and/or plane detection. The widget placement system 222 may identify a surface as suitable if it meets one or more requirements, e.g., it is substantially upright, it contains no or little information or salient features, it is not too close to the user (e.g., more than a minimum distance from the XR device 110), and/or it is not too far from the user (e.g., less than a maximum distance from the XR device 110).

In some examples, as one of the above requirements, the widget placement system 222 scans the scene 700 for widget-incompatible objects to ensure that information is not placed on, or over, a widget-incompatible object. The XR device 110 may, for example, perform object detection to identify objects in the scene 700, with certain objects being classified as widget-incompatible objects. For example, dynamic objects, such as cars, persons, traffic lights or other traffic signals, active computer displays, or the like, may be classified as incompatible, and the XR device 110 thus avoids placing a virtual content widget on or in association with such an object.

Furthermore, as one of the above requirements, the XR device 110 may determine user context that includes a primary focus area of the user 106 in the current situation. For example, based on the sensor data 234, the XR device 110 may determine that the user 106 is currently working and that a current primary focus area is a book or computer that the user is viewing. The XR device 110 may then select the widget location to be outside of the primary focus area.

Referring again specifically to FIGS. 6 and 7, at operation 610 of the method 600, a ray casting operation is performed to identify the upright surface 702. The XR device 110 may also identify that the upright surface 702 in the field of view of the XR device 110 is a surface of a static object with no salient elements or information and is outside of a current primary focus area of the user 106, thus meeting the requirements or conditions for a widget location. The widget placement system 222 then selects the upright surface 702 as the widget location.

At operation 612, the method 600 includes placing and presenting, by the XR device 110, the virtual content widget 706 as overlaid on the upright surface 702. The virtual content widget 706 is positioned and oriented such that it is aligned with the upright surface 702, thus essentially appearing to be "attached" to the upright surface 702. The XR device 110 may orient the virtual content widget 706 along a plane as defined in the three-dimensional representation of the scene 700. In the example of FIG. 7, the virtual content widget 706 is a weather widget.

It will be appreciated that multiple virtual content widgets may be placed in this manner. For example, and as shown in FIG. 6 at operation 614, the user 106 may continue looking around the room in the scene 700. The XR device 110 may then use the same techniques to place one or more further virtual content widgets (operation 616) and present them as overlaid on the upright surface 702, provided that the relevant conditions are met. For example, the XR device 110 may ensure that virtual content widgets do not overlap with each other in the field of view, that virtual content widgets are spaced apart from each other by a predefined distance, and/or that no more than a threshold number of virtual content widgets are presented at the same time or on the same plane. The method 600 concludes at closing loop element 618.

The widget placement system 222 may place widgets based on a predefined order (e.g., place a weather widget first, and then place a social media widget), or the order of placement may be dynamically or adaptively determined, e.g., based on user context indicative of the current user activity, location, or the like. For example, the user 106 may have three widgets activated on the XR device 110, and a predefined order may be: a weather widget, then a news widget, and then a financial (e.g., stocks) widget. During a user session, the user 106 is working at a desk and looks around the room, triggering widget placement. The weather widget is placed first by computing a first ray/plane intersection with the environment and the center eye ray, with the requirement of having a vertical surface (and optionally one or more other requirements). The weather widget is then placed as described above, and will remain in position until the user 106 moves away from the initial position. When the user is then looking for other information to access and looks further around the room, the news widget and the financial widget are placed at appropriate widget locations using a similar technique. This process may continue until all widgets have been placed and presented.

Depending on the user context, the widget placement system 222 may determine when and how to update placement of one or more virtual content widgets. For example, if the user 106 is sitting, the widget placement system 222 may keep the virtual content widget 706 in the position shown in FIG. 7 for longer, while if the user 106 is walking or standing, the widget placement system 222 may more quickly update the widget location of the virtual content widget 706 to accommodate movements, or potential movements, of the user 106.

Object-Aware Placement

Figure 8:
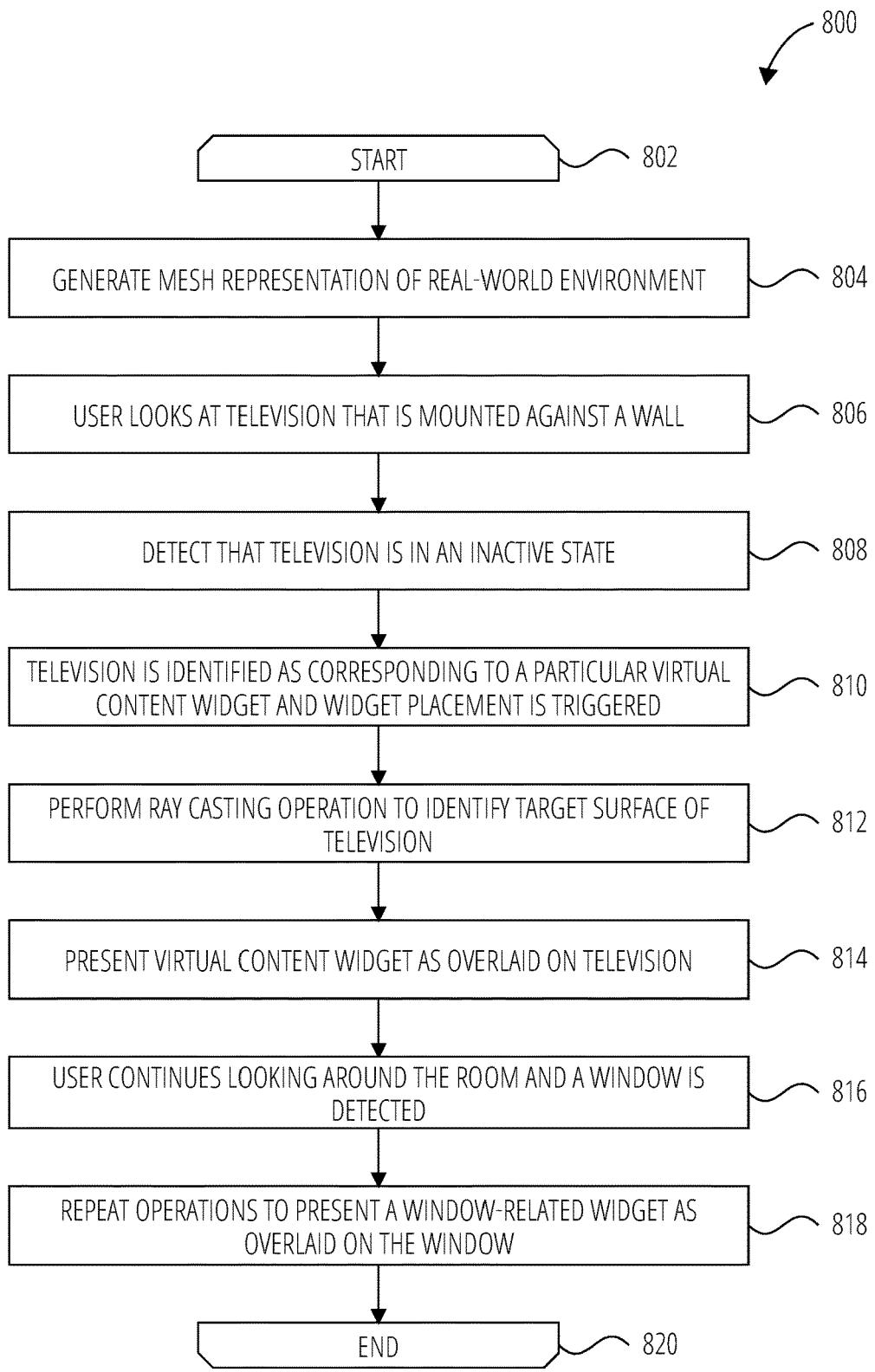
FIG. 8 is a flowchart illustrating a method suitable for dynamic placement of a virtual content widget by an XR device, according to some examples, in which an object-aware placement technique is implemented.

FIG. 8 is a flowchart illustrating a method 800 suitable for dynamic placement of a virtual content widget by an XR device, according to some examples, in which an object-aware placement technique is implemented. Operations in the method 800 may be performed by an XR device using components (e.g., parts, modules, systems, or engines) described above with respect to FIGS. 1 and 2. Accordingly, by way of example and not limitation, the method 800 is described with reference to the XR device 110 and certain components thereof. The method 800 is further described with reference to a scene 900 depicted in FIG. 9 to illustrate the manner in which object-aware placement can be performed by the XR device 110, according to some examples. However, it shall be appreciated that at least some of the operations of the scene 900 may be deployed on various other hardware configurations or be performed by similar components residing elsewhere, and that the operations may be applied in different scenes and user scenarios.

In some examples, to perform object-aware placement, the XR device 110 utilizes a combination of object detection and surface or plane identification (e.g., using mesh representations and/or plane tracking). The XR device 110 determines positions of real-world objects in the field of view, checks whether any object is an "object of interest" (as discussed further below), and if so, the XR device 110 renders and presents a corresponding information content item, such as a virtual content widget.

Figure 9:
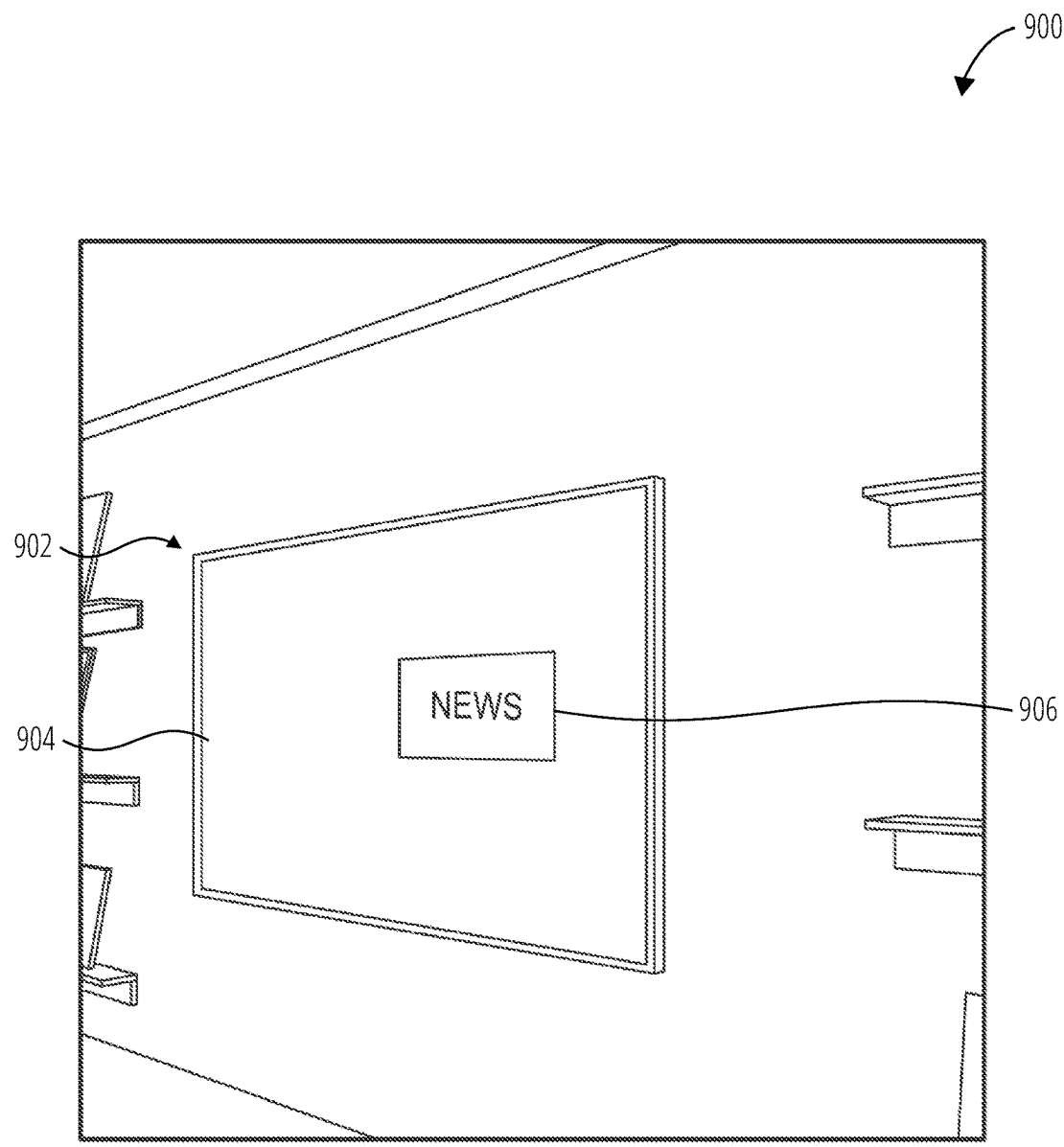
FIG. 9 is a perspective view of a scene viewed by a user of an XR device, according to some examples, in which a virtual content widget is overlaid on a target surface of a real-world environment.

The method 800 commences at opening loop element 802 and proceeds to operation 804, where a three-dimensional representation of the scene 900 is generated and dynamically updated during a user session, e.g., as described above. In FIG. 9, the user 106 is located in a living room and looks at a real-world object in the example form of a television 902 that is mounted against a wall, at operation 806. The XR device 110 detects the television 902 using object detection (e.g., the object tracking system 220) and also detects that the television 902 is in an inactive state, e.g., not switched on or not displaying any content (operation 808). The XR device 110 further determines that the television 902 is classified as an "object of interest." In this case, the television 902 is an object of interest, because it has an object type that corresponds to a widget type, as stored in the widget placement settings 240 of the XR device 110. For example, the television 902 may be detected as an object of the object type "television," which is stored in association with the widget type "news" in the widget placement settings 240.

Accordingly, at operation 810, the XR device 110 identifies that the television 902 is an object corresponding to, or matching, a particular type of virtual content widget, and this triggers widget placement. To determine a suitable widget location, at operation 812, the XR device 110 may perform a ray casting operation to obtain the location of a television surface 904, e.g., by determining an intersection of a center ray with the result of the object detection within the context of the current three-dimensional representation of the scene 900. In some examples, the XR device 110 may perform surface/plane detection to identify the appropriate television surface 904 once the object tracking system 220 has detected the presence of the television 902.

At operation 814 of the method 800, the relevant virtual content widget is then placed and caused to be presented as overlaid on the appropriate television surface 904, e.g., in the manner described above. As mentioned, in this case, the virtual content widget 906 is a news widget, given the association between the "television" object type and the "news" widget type stored by the XR device 110 (or stored in a database accessible to the XR device 110). In FIG. 9, the television 902 is determined to be in an inactive state and the virtual content widget 906 is overlaid onto the display of the television 902. If the television 902 is determined to be in an active state (e.g., displaying content), the XR device 110 may instead present the virtual content widget 906 adjacent to, but still in directional alignment with, the television surface 904.

It will be appreciated that multiple virtual content widgets may be placed in this (object-aware) manner. For example, and as shown in FIG. 8 at operation 816, the user 106 may continue looking around the room in the scene 900 and a window (not shown in FIG. 9) may be detected in the field of view. The XR device 110 may detect that another type of virtual content widget, e.g., a weather widget, matches the object type "window," and then use the same techniques to place and present a weather widget as overlaid on the window (operation 818). The user 106 may define relationships between real-world objects and widgets and/or the XR device 110 may automatically surface a widget based on a predefined relationship between the widget and a detected real-world object.

In some examples, once object-aware type placement has been performed to place one or more virtual content widgets in a particular scene, the placement may persist for as long as the current user context is valid, e.g., for as long as the user 106 is in the room in which the relevant real-world objects were detected. For example, if the user 106 leaves the room, the XR device 110 may detect that there has been a significant change to the user context, and a widget presentation mode may be deactivated (or a new widget placement process may commence based on new user context). The method 800 concludes at closing loop element 820.

Table 1 below provides non-limiting examples of real-world objects that may be classified as "objects of interest," together with examples of corresponding (e.g., matching or connected) virtual content widgets.

TABLE 1

| Real-world object | Corresponding virtual content widget |
|---|---|
| Television | News widget |
| Window | Weather widget |
| Clock | Calendar widget |
| Cupboard | Time widget |
| Refrigerator | To-do list widget |

While the orientation-guided method, the world-aligned method, and the object-aware method have each been described with reference to separate examples, it is noted that these methods, or aspects thereof, may be used in combination. For example, the object-aware technique may be performed by the XR device 110 to identify a specific object that triggers an associated virtual content widget, while aspects of the world-aligned method may also be performed by the XR device 110 at the same time to ensure that the virtual content widget is placed in an appropriate manner.

Figure 10:
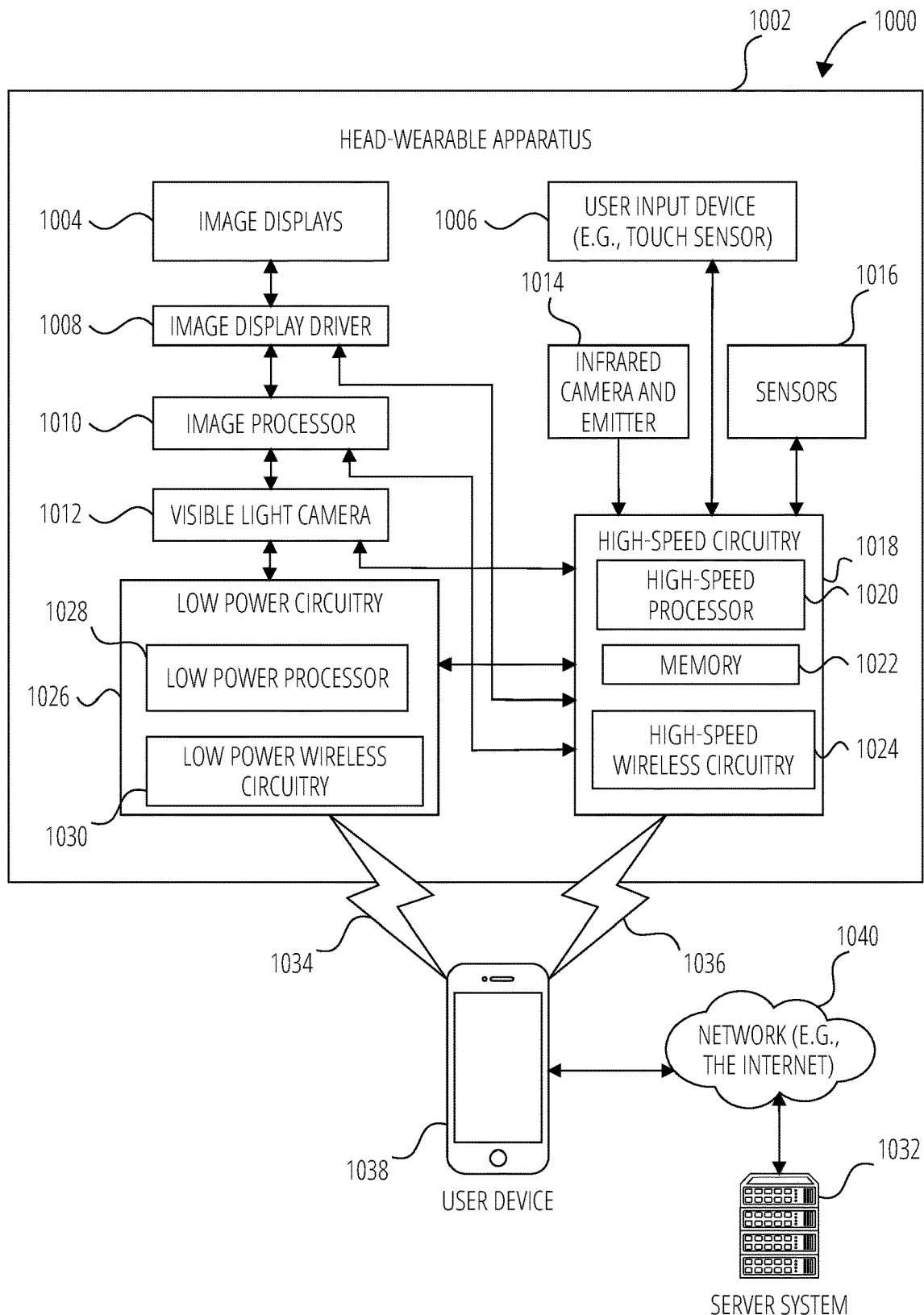
FIG. 10 illustrates a network environment in which a head-wearable apparatus can be implemented according to some examples.

FIG. 10 illustrates a network environment 1000 in which a head-wearable apparatus 1002, e.g., a head-wearable XR device, can be implemented according to some examples. FIG. 10 provides a high-level functional block diagram of an example head-wearable apparatus 1002 communicatively coupled a mobile user device 1038 and a server system 1032 via a suitable network 1040. One or more of the techniques described herein may be performed using the head-wearable apparatus 1002 or a network of devices similar to those shown in FIG. 10.

The head-wearable apparatus 1002 includes a camera, such as at least one of a visible light camera 1012 and an infrared camera and emitter 1014. The head-wearable apparatus 1002 includes other sensors 1016, such as motion sensors or eye tracking sensors. The user device 1038 can be capable of connecting with head-wearable apparatus 1002 using both a communication link 1034 and a communication link 1036. The user device 1038 is connected to the server system 1032 via the network 1040. The network 1040 may include any combination of wired and wireless connections.

The head-wearable apparatus 1002 includes a display arrangement that has several components. The arrangement includes two image displays 1004 of an optical assembly. The two displays include one associated with the left lateral side and one associated with the right lateral side of the head-wearable apparatus 1002. The head-wearable apparatus 1002 also includes an image display driver 1008, an image processor 1010, low power circuitry 1026, and high-speed circuitry 1018. The image displays 1004 are for presenting images and videos, including an image that can provide a graphical user interface (GUI) to a user of the head-wearable apparatus 1002.

The image display driver 1008 commands and controls the image display of each of the image displays 1004. The image display driver 1008 may deliver image data directly to each image display of the image displays 1004 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 1002 may include a frame and stems (or temples) extending from a lateral side of the frame, or another component to facilitate wearing of the head-wearable apparatus 1002 by a user. The head-wearable apparatus 1002 of FIG. 10 further includes a user input device 1006 (e.g., touch sensor or push button) including an input surface on the head-wearable apparatus 1002. The user input device 1006 is configured to receive, from the user, an input selection to manipulate the GUI of the presented image.

The components shown in FIG. 10 for the head-wearable apparatus 1002 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 1002. Left and right sides of the head-wearable apparatus 1002 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1002 includes a memory 1022 which stores instructions to perform a subset or all of the functions described herein. The memory 1022 can also include a storage device. As further shown in FIG. 10, the high-speed circuitry 1018 includes a high-speed processor 1020, the memory 1022, and high-speed wireless circuitry 1024. In FIG. 10, the image display driver 1008 is coupled to the high-speed circuitry 1018 and operated by the high-speed processor 1020 in order to drive the left and right image displays of the image displays 1004. The high-speed processor 1020 may be any processor capable of managing high-speed communications and operation of any general computing system needed for the head-wearable apparatus 1002. The high-speed processor 1020 includes processing resources needed for managing high-speed data transfers over the communication link 1036 to a wireless local area network (WLAN) using high-speed wireless circuitry 1024. In certain examples, the high-speed processor 1020 executes an operating system such as a LINUX operating system or other such operating system of the head-wearable apparatus 1002 and the operating system is stored in memory 1022 for execution. In addition to any other responsibilities, the high-speed processor 1020 executing a software architecture for the head-wearable apparatus 1002 is used to manage data transfers with high-speed wireless circuitry 1024. In certain examples, high-speed wireless circuitry 1024 is configured to implement Institute of Electrical and Electronic Engineers (IEEE) 1002.11 communication standards, also referred to herein as Wi-Fi™. In other examples, other high-speed communications standards may be implemented by high-speed wireless circuitry 1024.

The low power wireless circuitry 1030 and the high-speed wireless circuitry 1024 of the head-wearable apparatus 1002 can include short range transceivers (Bluetooth™) and wireless wide, local, or wide area network transceivers (e.g., cellular or Wi-Fi™). The user device 1038, including the transceivers communicating via the communication link 1034 and communication link 1036, may be implemented using details of the architecture of the head-wearable apparatus 1002, as can other elements of the network 1040.

The memory 1022 includes any storage device capable of storing various data and applications, including, among other things, camera data generated by the visible light camera 1012, sensors 1016, and the image processor 1010, as well as images generated for display by the image display driver 1008 on the image displays of the image displays 1004. While the memory 1022 is shown as integrated with the high-speed circuitry 1018, in other examples, the memory 1022 may be an independent standalone element of the head-wearable apparatus 1002. In certain such examples, electrical routing lines may provide a connection through a chip that includes the high-speed processor 1020 from the image processor 1010 or low power processor 1028 to the memory 1022. In other examples, the high-speed processor 1020 may manage addressing of memory 1022 such that the low power processor 1028 will boot the high-speed processor 1020 any time that a read or write operation involving memory 1022 is needed.

As shown in FIG. 10, the low power processor 1028 or high-speed processor 1020 of the head-wearable apparatus 1002 can be coupled to the camera (visible light camera 1012, or infrared camera and emitter 1014), the image display driver 1008, the user input device 1006 (e.g., touch sensor or push button), and the memory 1022. The head-wearable apparatus 1002 also includes sensors 1016, which may be the motion components 1234, position components 1238, environmental components 1236, and biometric components 1232, e.g., as described below with reference to FIG. 12. In particular, motion components 1234 and position components 1238 are used by the head-wearable apparatus 1002 to determine and keep track of the position and orientation (the "pose") of the head-wearable apparatus 1002 relative to a frame of reference or another object, in conjunction with a video feed from one of the visible light cameras 1012, using for example techniques such as structure from motion (SfM) or VIO.

In some examples, and as shown in FIG. 10, the head-wearable apparatus 1002 is connected with a host computer. For example, the head-wearable apparatus 1002 is paired with the user device 1038 via the communication link 1036 or connected to the server system 1032 via the network 1040. The server system 1032 may be one or more computing devices as part of a service or network computing system, for example, that include a processor, a memory, and network communication interface to communicate over the network 1040 with the user device 1038 and head-wearable apparatus 1002.

The user device 1038 includes a processor and a network communication interface coupled to the processor. The network communication interface allows for communication over the network 1040, communication link 1034 or communication link 1036. The user device 1038 can further store at least portions of the instructions for implementing functionality described herein.

Output components of the head-wearable apparatus 1002 include visual components, such as a display (e.g., one or more liquid-crystal display (LCD)), one or more plasma display panel (PDP), one or more light emitting diode (LED) display, one or more projector, or one or more waveguide. The image displays 1004 of the optical assembly are driven by the image display driver 1008. The output components of the head-wearable apparatus 1002 further include acoustic components (e.g., speakers), haptic components (e.g., a vibratory motor), other signal generators, and so forth. The input components of the head-wearable apparatus 1002, the user device 1038, and server system 1032, such as the user input device 1006, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1002 may optionally include additional peripheral device elements. Such peripheral device elements may include biometric sensors, additional sensors, or display elements integrated with the head-wearable apparatus 1002. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1036 from the user device 1038 via the low power wireless circuitry 1030 or high-speed wireless circuitry 1024.

Figure 11:
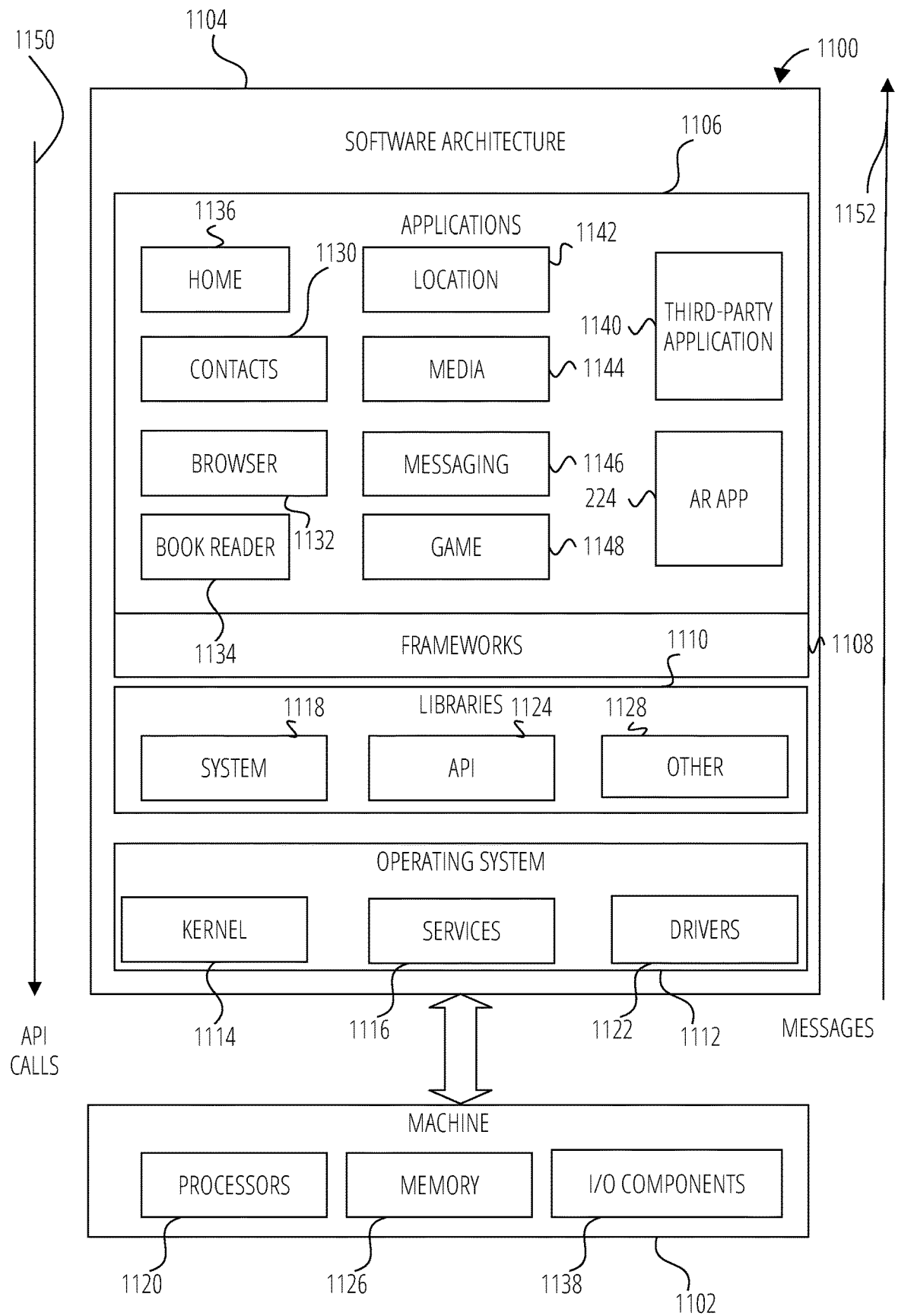
FIG. 11 is a block diagram showing a software architecture within which the present disclosure may be implemented, according to some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and input/output, or I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke Application Programming Interface (API) calls 1150, through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various GUI functions, high-level resource management, and high-level location services. The frameworks 1108 can provide a broad spectrum of other APIs that can be used by the applications 1106, some of which may be specific to a particular operating system or platform.

In some examples, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In some examples, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 11, the third-party application 1140 can invoke the API calls 1150 provided by the operating system 1112 to facilitate functionality described herein. The applications 1106 may include an AR application such as the AR application 224 described herein, according to some examples.

Figure 12:
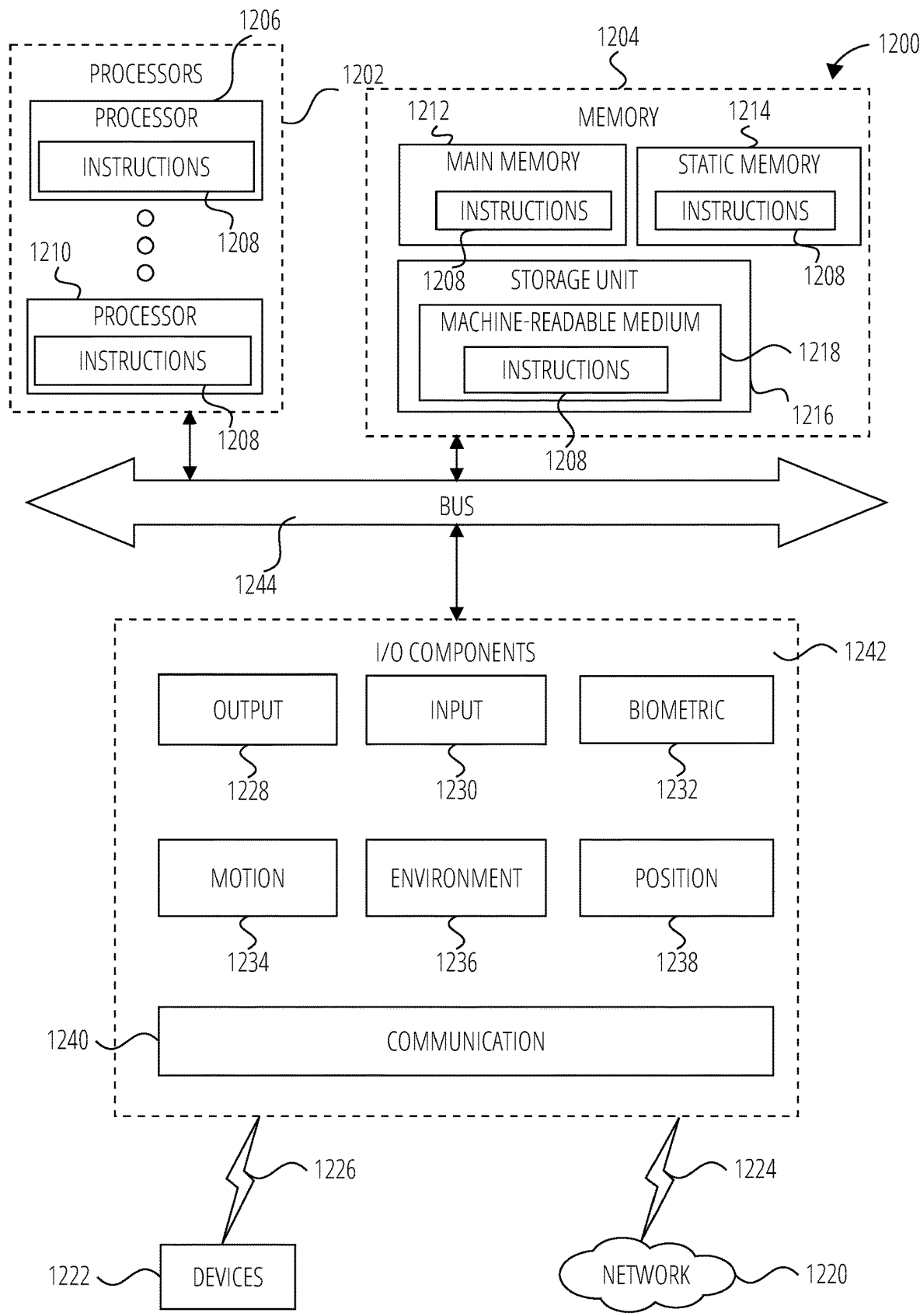
FIG. 12 is a diagrammatic representation of a machine in the form of a computer system within which a set of instructions may be executed for causing the machine to perform any one or more of the methodologies discussed herein, according to some examples.

FIG. 12 is a diagrammatic representation of a machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), XR device, AR device, VR device, a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In some examples, the processors 1202 (e.g., a Central Processing Unit (CPU), a Reduced Instruction Set Computing (RISC) processor, a Complex Instruction Set Computing (CISC) Processor, a Graphics Processing Unit, a Digital Signal Processor (DSP), an Application-Specific Integrated Circuit (ASIC), a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, accessible to the processors via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors, or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various examples, the I/O components 1242 may include output components 1228 and input components 1230. The output components 1228 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth™ components, Wi-Fi™ components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi™ signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

XR devices, such as smart glasses or other XR eyewear, are being used with increasing frequency and may, at least in some cases, become part of the day-to-day life of a user. Such XR devices have the potential to enhance user experiences, e.g., by providing relevant information and functionality at the right place or the right time. However, this requires appropriate placement of virtual content in the field of view. Examples described herein may enable an XR device to implement intelligent or improved placement strategies, thereby improving user experience and facilitating adoption of XR devices. For example, virtual content widgets may be automatically placed at widget locations that reduce the risk of user discomfort, user distraction, or interference with real-world information, thus making it easier for a user to use the XR device for continuous or longer periods.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus, the following claims are hereby incorporated into the Detailed Description.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method comprising: accessing sensor data obtained using one or more sensors of an extended reality (XR) device; determining, based on the sensor data, user context associated with a user of the XR device; identifying a virtual content widget for presentation to the user; selecting, based on the user context, a widget location; and causing presentation, via a display component of the XR device, of the virtual content widget at the widget location.

In Example 2, the subject matter of Example 1 includes, wherein determining the user context comprises detecting, based on the sensor data, a widget-activation gesture performed by the user.

In Example 3, the subject matter of Example 2 includes, wherein the widget-activation gesture comprises a downward-looking action performed by the user, and wherein selecting the widget location comprises selecting a target surface in a real-world environment within a field of view of the XR device, the target surface being located below a user eye level, and the virtual content widget being presented to the user as overlaid on the target surface.

In Example 4, the subject matter of Examples 1-3 includes, wherein determining the user context comprises detecting, based on the sensor data, a real-world object in a field of view of the XR device.

In Example 5, the subject matter of Example 4 includes, wherein identifying the virtual content widget comprises identifying an object type of the real-world object and matching the object type to a widget type of the virtual content widget.

In Example 6, the subject matter of Example 5 includes, wherein the widget location is selected such that the virtual content widget is presented to the user as overlaid on or adjacent to the real-world object.

In Example 7, the subject matter of Examples 4-6 includes, wherein detecting the real-world object comprises detecting that the real-world object is a widget-incompatible object, and wherein the widget location is selected to avoid placement of the virtual content widget on the widget-incompatible object.

In Example 8, the subject matter of Examples 1-7 includes, wherein selecting the widget location comprises: identifying a target surface in a real-world environment within a field of view of the XR device; and selecting the widget location such that the virtual content widget is presented to the user as overlaid on the target surface.

In Example 9, the subject matter of Example 8 includes, wherein identifying the target surface comprises: using the sensor data to generate a three-dimensional representation of at least part of the real-world environment; and performing a ray casting operation to identify the target surface.

In Example 10, the subject matter of Examples 8-9 includes, wherein identifying the target surface comprises using the sensor data to perform a plane detection operation.

In Example 11, the subject matter of Examples 8-10 includes, wherein the target surface is a substantially upright surface in the real-world environment, the virtual content widget being presented as overlaid on, and in three-dimensional alignment with, the target surface.

In Example 12, the subject matter of Examples 8-11 includes, wherein causing presentation of the virtual content widget at the widget location comprises: tracking a pose of the XR device relative to the real-world environment; dynamically updating the widget location based on changes in the tracked pose of the XR device; and causing the presentation of the virtual content widget to be dynamically adjusted, based on the updating of the widget location, such that the virtual content widget remains presented to the user as overlaid on the target surface.

In Example 13, the subject matter of Examples 1-12 includes, wherein determining the user context comprises determining, based on the sensor data, a primary focus area within a field of view of the XR device, and wherein the widget location is selected to be outside of the primary focus area.

In Example 14, the subject matter of Examples 1-13 includes, wherein causing presentation of the virtual content widget comprises causing the virtual content widget to be continuously presented to the user until detecting a predefined change in the user context.

In Example 15, the subject matter of Examples 1-14 includes, determining that the user context matches a widget placement trigger, wherein presentation of the virtual content widget is caused responsive to determining that the user context matches the widget placement trigger.

In Example 16, the subject matter of Examples 1-15 includes, wherein the virtual content widget is a first virtual content widget, and wherein the widget location is a first widget location, the method further comprising: identifying a second virtual content widget for presentation to the user; selecting, based on the user context and the first widget location, a second widget location, the second widget location being spaced apart from the first widget location; and causing presentation, via the display component of the XR device and while the first virtual content widget is being presented at the first widget location, of the second virtual content widget at the second widget location.

In Example 17, the subject matter of Examples 1-16 includes, wherein the sensor data comprises at least one of: optical sensor data; depth sensor data; eye tracking sensor data; or inertial sensor data.

In Example 18, the subject matter of Examples 1-17 includes, wherein the virtual content widget comprises at least one of: a weather widget; a time widget; a calendar widget; a messaging widget; a news widget; a financial widget; a navigation widget, or a media widget.

Example 19 is an extended reality (XR) device comprising: at least one processor; and at least one memory component storing instructions that, when executed by the at least one processor, configure the XR device to perform operations comprising: accessing sensor data obtained using one or more sensors of the XR device; determining, based on the sensor data, user context associated with a user of the XR device; identifying a virtual content widget for presentation to the user; selecting, based on the user context, a widget location; and causing presentation, via a display component of the XR device, of the virtual content widget at the widget location.

Example 20 is a non-transitory computer-readable storage medium, the computer-readable storage medium including instructions that when executed by at least one processor, cause the at least one processor to perform operations comprising: accessing sensor data obtained using one or more sensors of an extended reality (XR) device; determining, based on the sensor data, user context associated with a user of the XR device; identifying a virtual content widget for presentation to the user; selecting, based on the user context, a widget location; and causing presentation, via a display component of the XR device, of the virtual content widget at the widget location.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method comprising:
   accessing sensor data obtained using one or more sensors of an extended reality (XR) device;
   determining, based on the sensor data, user context associated with a user of the XR device, the determining of the user context comprising detecting a real-world object in a field of view of the XR device;
   accessing a stored mapping between object types and widget types;
   identifying a virtual content widget for presentation to the user by identifying an object type of the real-world object and matching, based on the stored mapping, the object type to a corresponding widget type of the virtual content widget;
   selecting, based on the user context, a widget location; and
   causing presentation, via a display of the XR device, of the virtual content widget at the widget location.

2. The method of claim 1, wherein the widget location is selected such that the virtual content widget is presented to the user as overlaid on or adjacent to the real-world object.

3. The method of claim 1, wherein the method further comprises:

detecting a further real-world object that is a widget-incompatible object, wherein the widget location is selected to avoid placement of the virtual content widget on the widget-incompatible object.

4. The method of claim 1, wherein selecting the widget location comprises:
identifying a target surface in a real-world environment within a field of view of the XR device; and
selecting the widget location such that the virtual content widget is presented to the user as overlaid on the target surface.

5. The method of claim 4, wherein identifying the target surface comprises:
using the sensor data to generate a three-dimensional representation of at least part of the real-world environment; and
performing ray casting to identify the target surface.

6. The method of claim 4, wherein identifying the target surface comprises using the sensor data to perform plane detection.

7. The method of claim 4, wherein the target surface is a substantially upright surface in the real-world environment, the virtual content widget being presented as overlaid on, and in three-dimensional alignment with, the target surface.

8. The method of claim 4, wherein causing presentation of the virtual content widget at the widget location comprises:
tracking a pose of the XR device relative to the real-world environment;
dynamically updating the widget location based on changes in the tracked pose of the XR device; and
causing the presentation of the virtual content widget to be dynamically adjusted, based on the updating of the widget location, such that the virtual content widget remains presented to the user as overlaid on the target surface.

9. The method of claim 1, wherein determining the user context comprises determining, based on the sensor data, a primary focus area within a field of view of the XR device, and wherein the widget location is selected to be outside of the primary focus area.

10. The method of claim 1, wherein causing presentation of the virtual content widget comprises causing the virtual content widget to be continuously presented to the user until detecting a predefined change in the user context.

11. The method of claim 1, further comprising:
determining that the user context matches a widget placement trigger, wherein presentation of the virtual content widget is caused responsive to determining that the user context matches the widget placement trigger.

12. The method of claim 1, wherein the virtual content widget is a first virtual content widget, and wherein the widget location is a first widget location, the method further comprising:
identifying a second virtual content widget for presentation to the user;
selecting, based on the user context and the first widget location, a second widget location, the second widget location being spaced apart from the first widget location; and
causing presentation, via the display of the XR device and while the first virtual content widget is being presented at the first widget location, of the second virtual content widget at the second widget location.

13. The method of claim 1, wherein the sensor data comprises at least one of: optical sensor data; depth sensor data; eye tracking sensor data; or inertial sensor data.

14. The method of claim 1, wherein the virtual content widget comprises at least one of: a weather widget; a time widget; a calendar widget; a messaging widget; a news widget; a financial widget; a navigation widget, or a media widget.

15. The method of claim 1, wherein the stored mapping comprising a mapping between at least one of: a television object and a news widget; a window object and a weather widget; a clock object and a calendar widget; a cupboard object and a time widget; or a refrigerator object and a to-do list widget.

16. The method of claim 1, further comprising:
determining a state of the real-world object that has the object type corresponding to the widget type of the virtual content widget, wherein the widget location is selected at least partially based on the state of the real-world object.

17. An extended reality (XR) device comprising:
at least one processor; and
at least one memory component storing instructions that, when executed by the at least one processor, configure the XR device to perform operations comprising:
accessing sensor data obtained using one or more sensors of the XR device;
determining, based on the sensor data, user context associated with a user of the XR device, determining of the user context comprising detecting a real-world object in a field of view of the XR device;
accessing a stored mapping between object types and widget types;
identifying a virtual content widget for presentation to the user by identifying an object type of the real-world object and matching, based on the stored mapping, the object type to a corresponding widget type of the virtual content widget;
selecting, based on the user context, a widget location; and
causing presentation, via a display of the XR device, of the virtual content widget at the widget location.

18. The XR device of claim 17, wherein the stored mapping comprising a mapping between at least one of: a television object and a news widget; a window object and a weather widget; a clock object and a calendar widget; a cupboard object and a time widget; or a refrigerator object and a to-do list widget.

19. A non-transitory computer-readable storage medium, the computer-readable storage medium including instructions that when executed by at least one processor, cause the at least one processor to perform operations comprising:
accessing sensor data obtained using one or more sensors of an extended reality (XR) device;
determining, based on the sensor data, user context associated with a user of the XR device, determining of the user context comprising detecting a real-world object in a field of view of the XR device;
accessing a stored mapping between object types and widget types;
identifying a virtual content widget for presentation to the user by identifying an object type of the real-world object and matching, based on the stored mapping, the object type to a corresponding widget type of the virtual content widget;
selecting, based on the user context, a widget location; and
causing presentation, via a display of the XR device, of the virtual content widget at the widget location.

20. The non-transitory computer-readable storage medium of claim 19, wherein the stored mapping comprising a mapping between at least one of: a television object and a news widget; a window object and a weather widget; a clock object and a calendar widget; a cupboard object and a time widget; or a refrigerator object and a to-do list widget.

* * * * *